United States Patent [19]

Suzuki et al.

[11] Patent Number: 5,065,175
[45] Date of Patent: Nov. 12, 1991

[54] SINGLE-LENS REFLEX CAMERA SYSTEM

[75] Inventors: Noboru Suzuki; Shigeo Toji, both of Tokyo; Masahiro Kawasaki, Saitama, all of Japan

[73] Assignee: Asahi Kogaku Kogyo Kabushiki Kaisha, Tokyo, Japan

[21] Appl. No.: 406,523

[22] Filed: Sep. 13, 1989

[30] Foreign Application Priority Data

Sep. 13, 1988 [JP] Japan .......................... 63-120307[U]
Sep. 13, 1988 [JP] Japan .......................... 63-120308[U]

[51] Int. Cl.⁵ .......................... G03B 3/00; G03B 13/18
[52] U.S. Cl. .............................. 354/400; 354/195.12; 354/286; 359/827
[58] Field of Search ........... 354/400, 402, 409, 195.1, 354/195.12, 286, 412, 446, 451, 452, 271.1; 350/252, 257

[56] References Cited

U.S. PATENT DOCUMENTS 4,841,327 6/1989 Yamamoto et al. ............... 354/412
4,945,376 7/1990 Kawasaki et al. ................. 354/400

FOREIGN PATENT DOCUMENTS 53-113527 10/1978 Japan .
62-133430 6/1987 Japan .
62-133431 6/1987 Japan .
62-200340 9/1987 Japan .
63-5331 1/1988 Japan .
63-189817 8/1988 Japan .
63-220118 9/1988 Japan .
64-44428 2/1989 Japan .
64-44429 2/1989 Japan .
64-56406 3/1989 Japan .
1-99011 4/1989 Japan .
1-99012 4/1989 Japan .
1-123206 5/1989 Japan .
1-131509 5/1989 Japan .

Primary Examiner—W. B. Perkey
Assistant Examiner—Cassandra Spyrou
Attorney, Agent, or Firm—Sandler, Greenblum & Bernstein

[57] ABSTRACT

An autofocus system for a single-lens-reflex camera system, in which an autofocus operation is executed in cooperation with a camera body and a lens unit mounted to the camera body. The amount of cooperation between the lens unit and camera body is determined by the camera body, and depends upon the performance of the lens unit mounted thereto. Where the lens unit is equipped with a computing means and a lens drive means, the camera body merely detects a defocus amount and sends it to the lens unit so that a focusing operation can be executed by the lens unit itself.

62 Claims, 16 Drawing Sheets

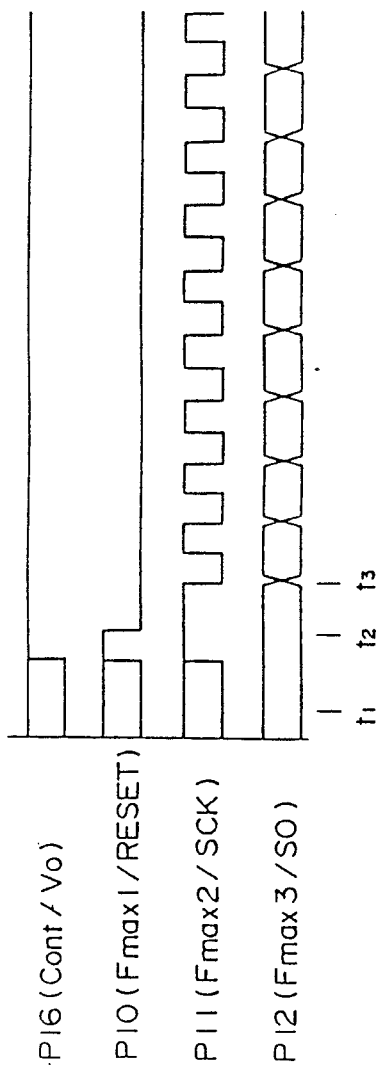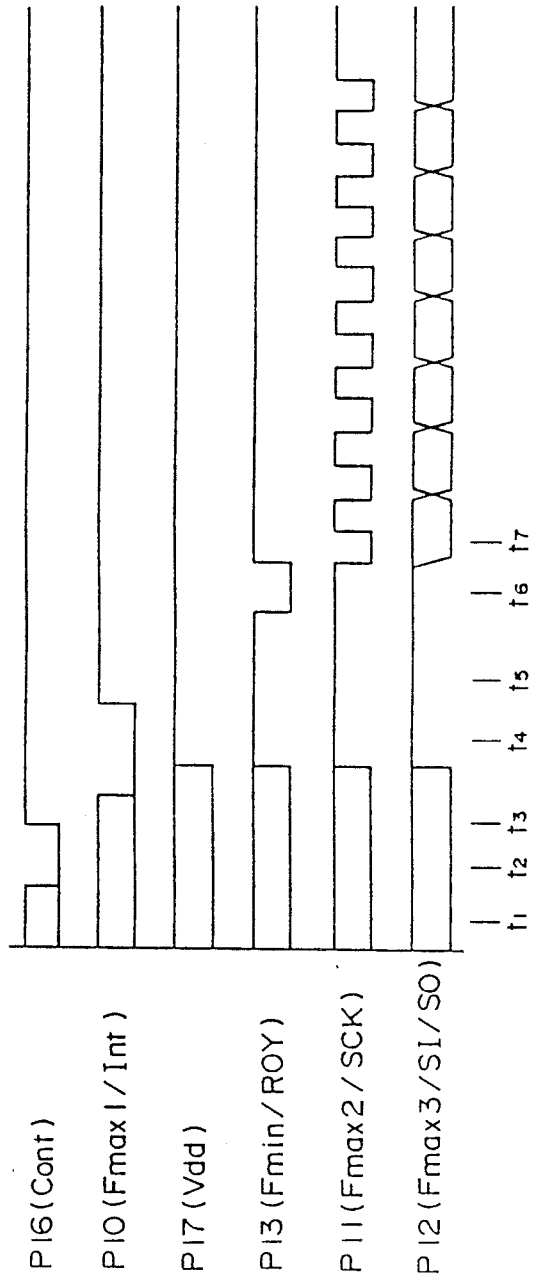

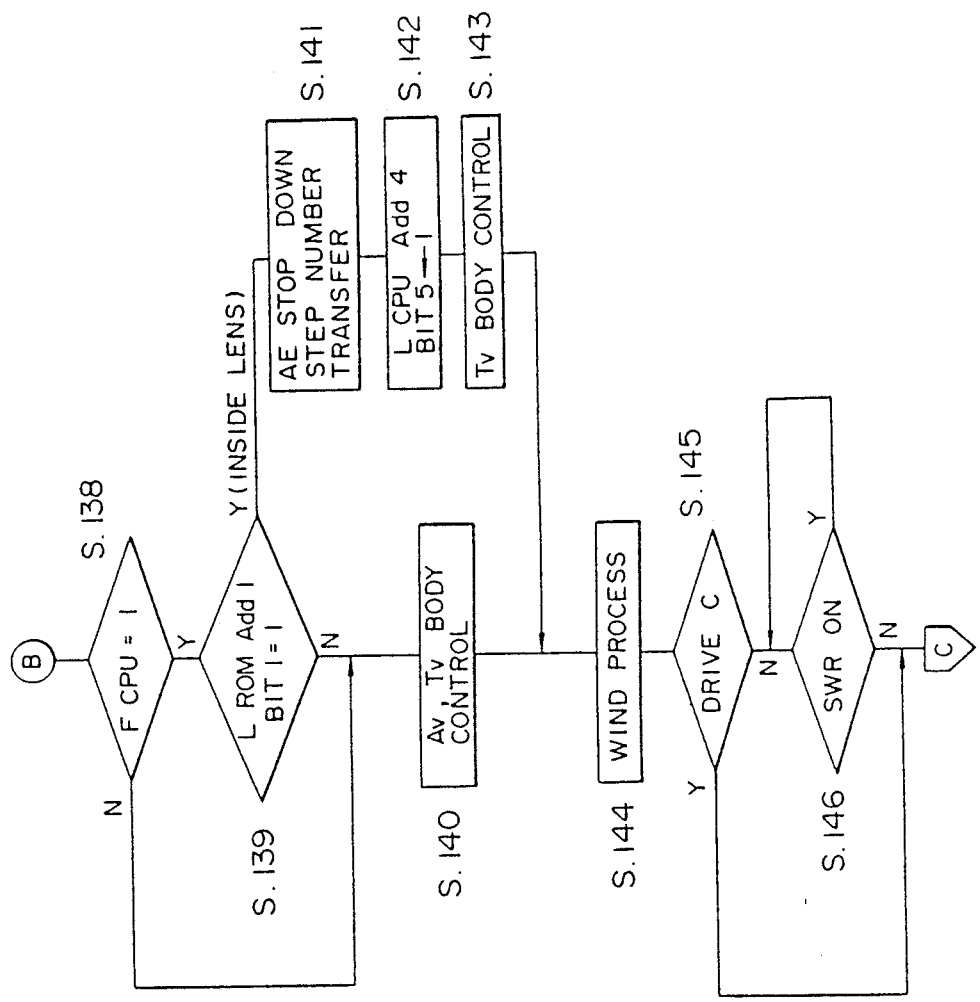

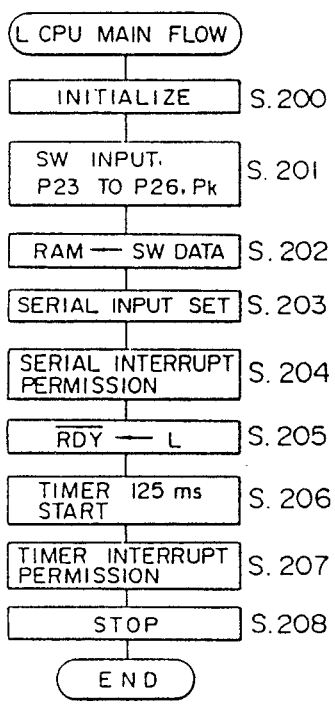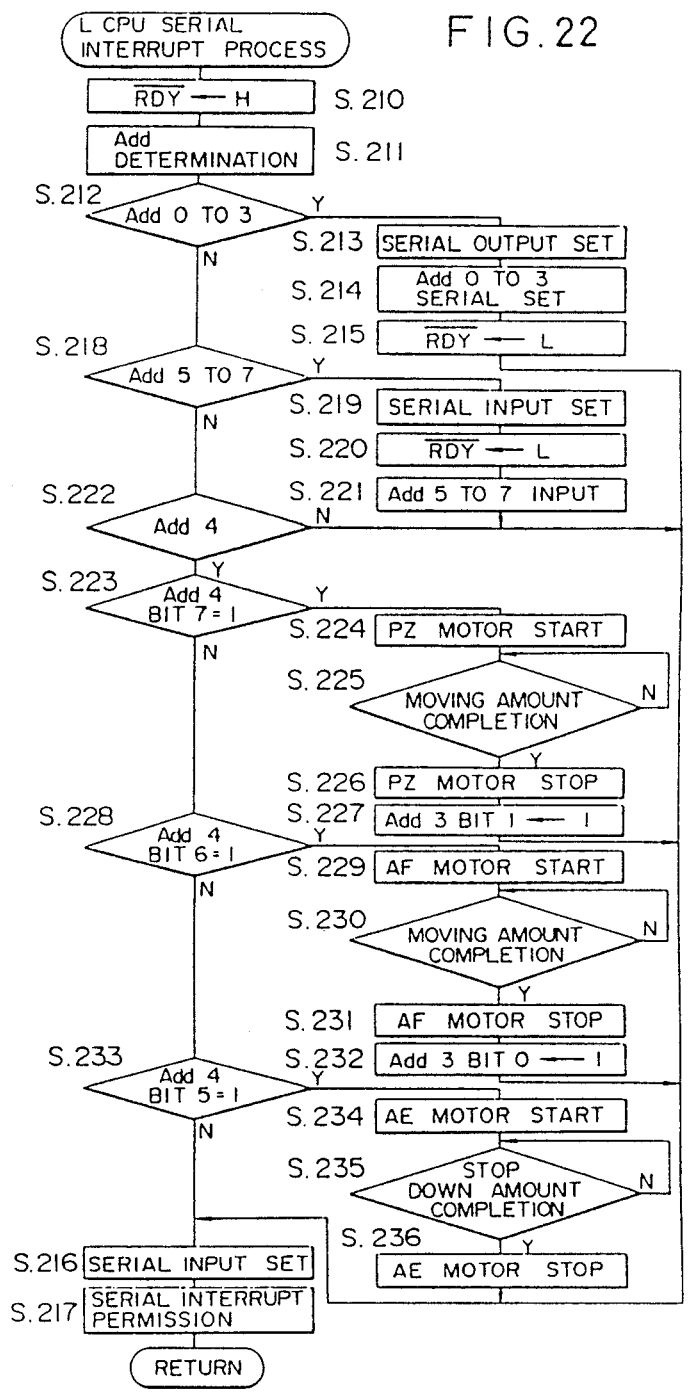

SINGLE-LENS REFLEX CAMERA SYSTEM

BACKGROUND OF THE INVENTION

This invention relates to a single-lens reflex camera whose lens is interchangeable, and more particularly to a system which optimally performs an autofocus control operation depending on the performance in combination of a camera body and a photographic lens being mounted.

To date, single-lens reflex cameras which are equipped with autofocus (AF) functions have been employed.

The single-lens reflex camera is a camera, to which a lens is interchangeably mounted. Since it requires a precise focusing adjustment, a method in which the amount of defocus is detected by the state of an image formed by light which passes through a lens, i.e., the so-called TTL (Through-The-Lens) type focus detection method, has been widely employed in AF (Automatic Focusing) operations.

When this method is used, a light reception device for AF operation is positioned in the body of the camera, and the elements to be driven are positioned in the lens unit. Thus, AF operation is performed by connecting the lens unit and the camera body mechanically or electrically together.

In the former case, (i.e., mechanical connection, a structure where the lens unit is equipped with only a drive force transmitting mechanism) and an AF motor provided in the camera body is used to drive the lens. In the latter case, a structure where the lens unit is equipped with an AF motor which turns on/off a motor in the camera body so as to perform a focusing operation, is used.

However, in the systems described above, the nonlinearity between the defocus amount and the amount of driving of the lens cannot be properly compensated for, because the conversion from the defocus amount into the number of pulses is conducted in a control circuit in the body. Thus, there was a problem where an optimum AF control corresponding to each interchangeable lens could not be performed.

In addition, in a structure where AF control and zoom lens driving are carried out with motors in a lens unit, since the items to be controlled in the lens unit increase, the computing capacity required for the body accordingly increases, resulting in increasing the computating load to the camera body.

Where functions of the photographic lens units are increased, it is desired for individual photographic lens units to have data processing capacity therein.

SUMMARY OF THE INVENTION

It is therefore an object of the present invention to provide an improved single-lens reflex camera system which is capable of performing more precise autofocus control with a lens unit having a control circuit therein for processing data, and to provide a camera body which distinguishes the data to be sent to the lens units depending on the type of the lens unit attached to the body.

For the above purpose, according to the invention, there is provided a single-lens reflex camera system comprising a camera body and a lens unit which is interchangeably mounted to the camera body, the camera body including means for detecting a defocus amount based upon the condition of the subject image formed by light having passed through a photographic lens, first means for transferring data related to the defocus amount detected by said detecting means, to said lens unit, and means for driving the photographic lens, the lens unit including memory means for storing information intrinsic to the lens unit, computing means for computing a driving amount of the photographic lens corresponding to the defocus amount transferred by the first transferring means, with information, stored in the memory means; and second transferring means for transferring the driving amount computed by the computing means, to the camera body, wherein the drive means of the camera body is operated in accordance with the driving amount transferred by the second transferring means.

According to another aspect of the invention, there is provided a camera body of a single-lens reflex camera, to which a lens unit is interchangeably mounted, comprising: detecting a defocus amount means for detecting based upon the condition of the subject image formed by light having passed through a photographic lens, means for transferring data related to the defocus amount detected by the detecting means, to the lens unit means for receiving data related to a driving amount of the photographic lens corresponding to the defocus amount, and means for driving the photographic lens based upon the drive amount.

In a further aspect of the invention, there is provided a lens unit of a single-lens reflex camera that is interchangeably mounted to a camera body, comprising memory means for storing information intrinsic to the lens unit, receiving means for receiving data from the camera body, the data relating to a defocus amount detected by the camera based upon the condition of the subject image formed by light having passed through a photographic lens, a means for computing driving amount of the photographic lens corresponding to the defocus amount with respect to information stored in the memory means, and means for transferring the driving amount to the camera body.

In still a further aspect of the invention, there is provided a single-lens reflex camera system comprising a camera body and a lens unit which is interchangeably mounted to the camera body, said camera body including means for detecting a defocus amount based upon the condition of a subject image formed by having a light pass through a photographic lens, means for computing a driving amount for the photographic lens corresponding to the defocus amount detected by the detecting means, with information stored in said lens unit; and means for transferring the driving amount computed by the computing means to the lens unit, the lens unit including a memory means for storing information intrinsic to the lens unit and means for driving the photographic lens.

According to other aspects of the invention, there is provided a camera body of a single-lens reflex camera, to which a lens unit is interchangeably mounted, which comprises means for detecting a defocus amount based upon the condition of a subject image formed by a light having that passed through a photographic lens, means for computing an amount to drive the photographic lens corresponding to the defocus amount detected by the detecting means, means for driving the photographic lens, a first means for determining whether the driving amount of the photographic lens is to be computed by the computing means and a second means for determining whether the photographic lens is to be driven by the drive means.

According to still another aspect of the invention, there is provided a lens unit of a single-lens reflex camera, to be mounted on a camera body, comprising a means for receiving data from the camera body, the data relating to a defocus amount detected based upon the condition of a subject image formed by light having passed through photographic lens, means for storing information intrinsic to the lens unit, means for computing a driving amount for the photographic lens corresponding to the defocus amount with information stored in the memory means and a means for driving the photographic lens, in accordance with the driving amount computed by the computing means.

DESCRIPTION OF THE ACCOMPANYING DRAWINGS

Figure 13:
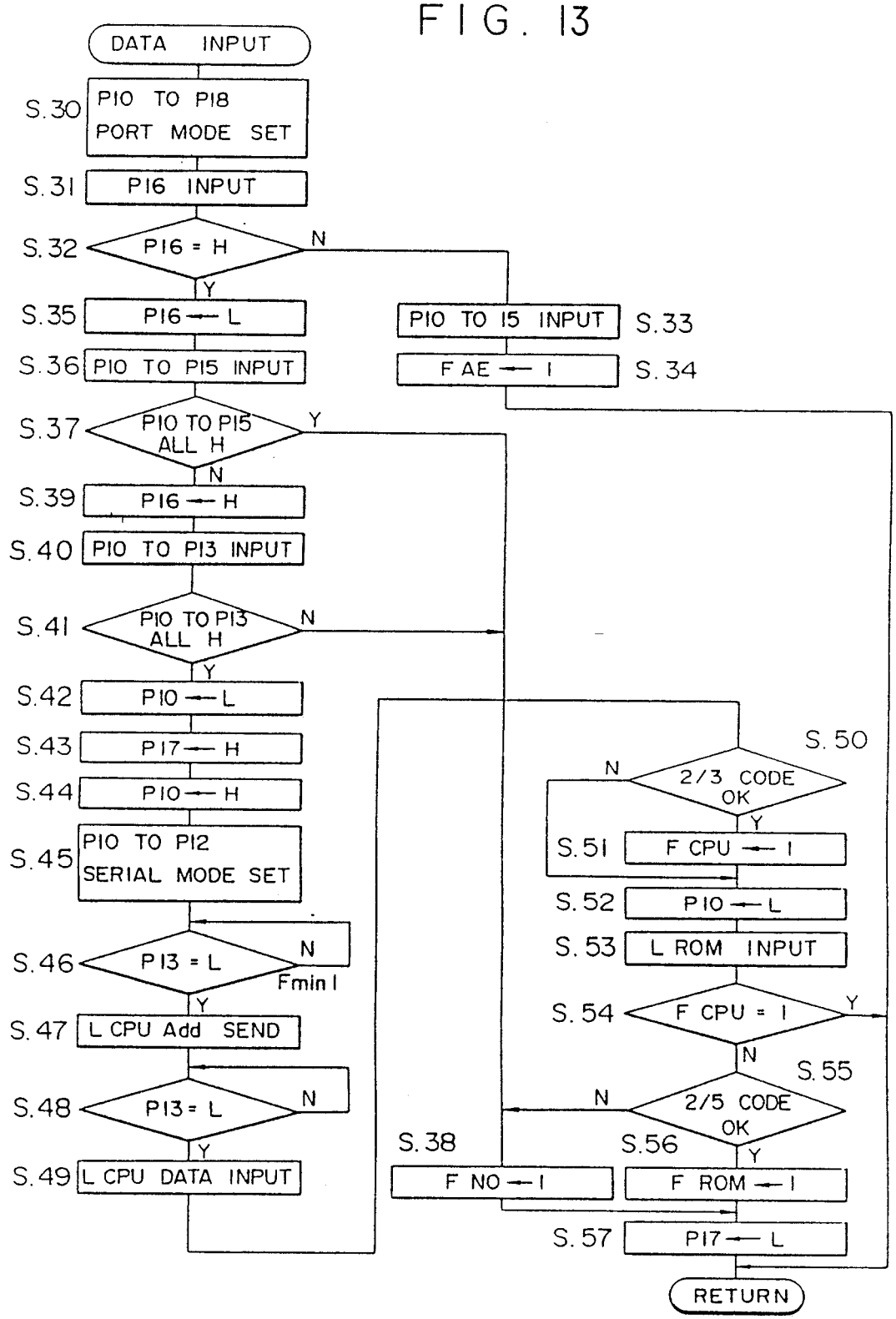
Figure 18:
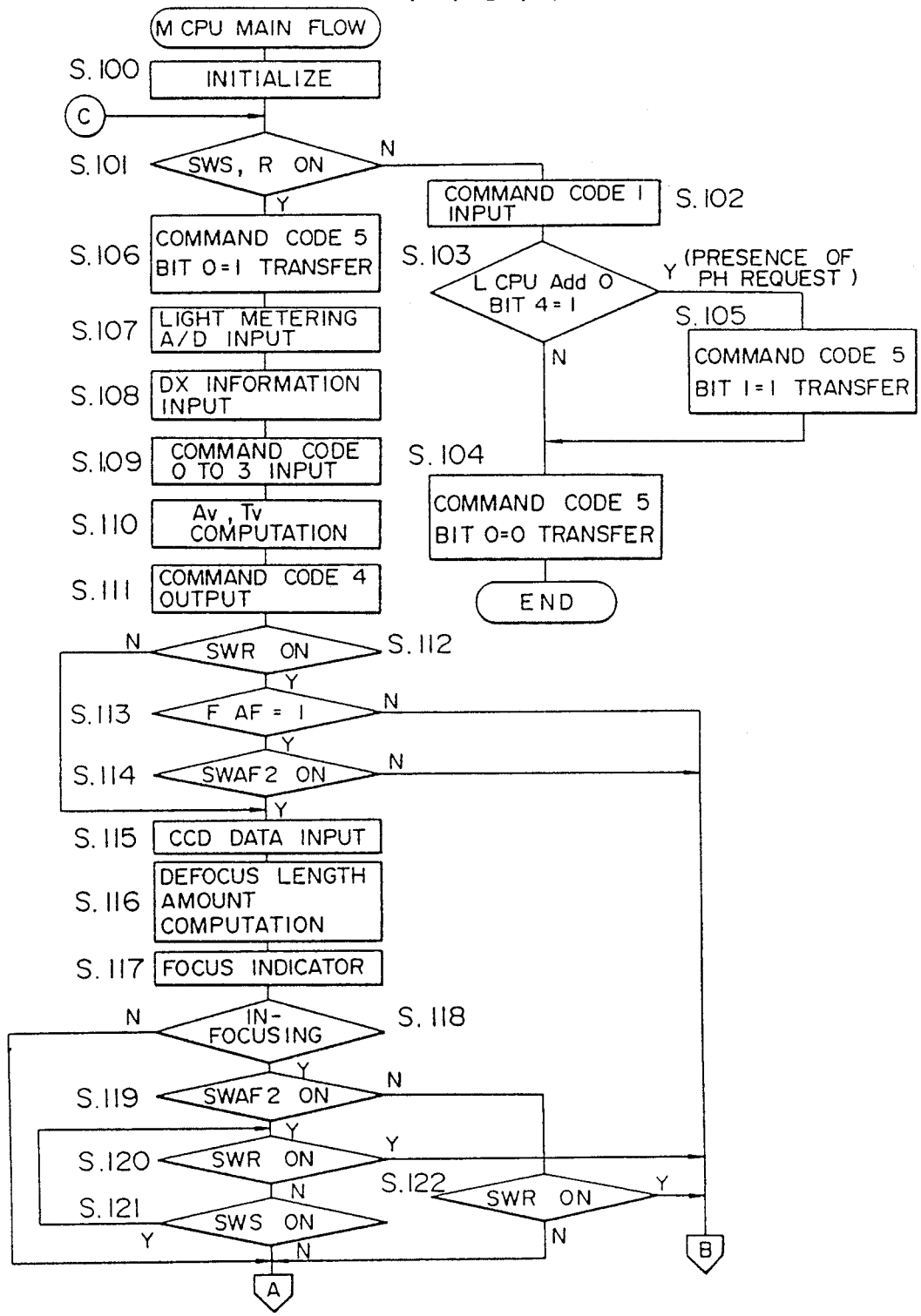
Figure 19:
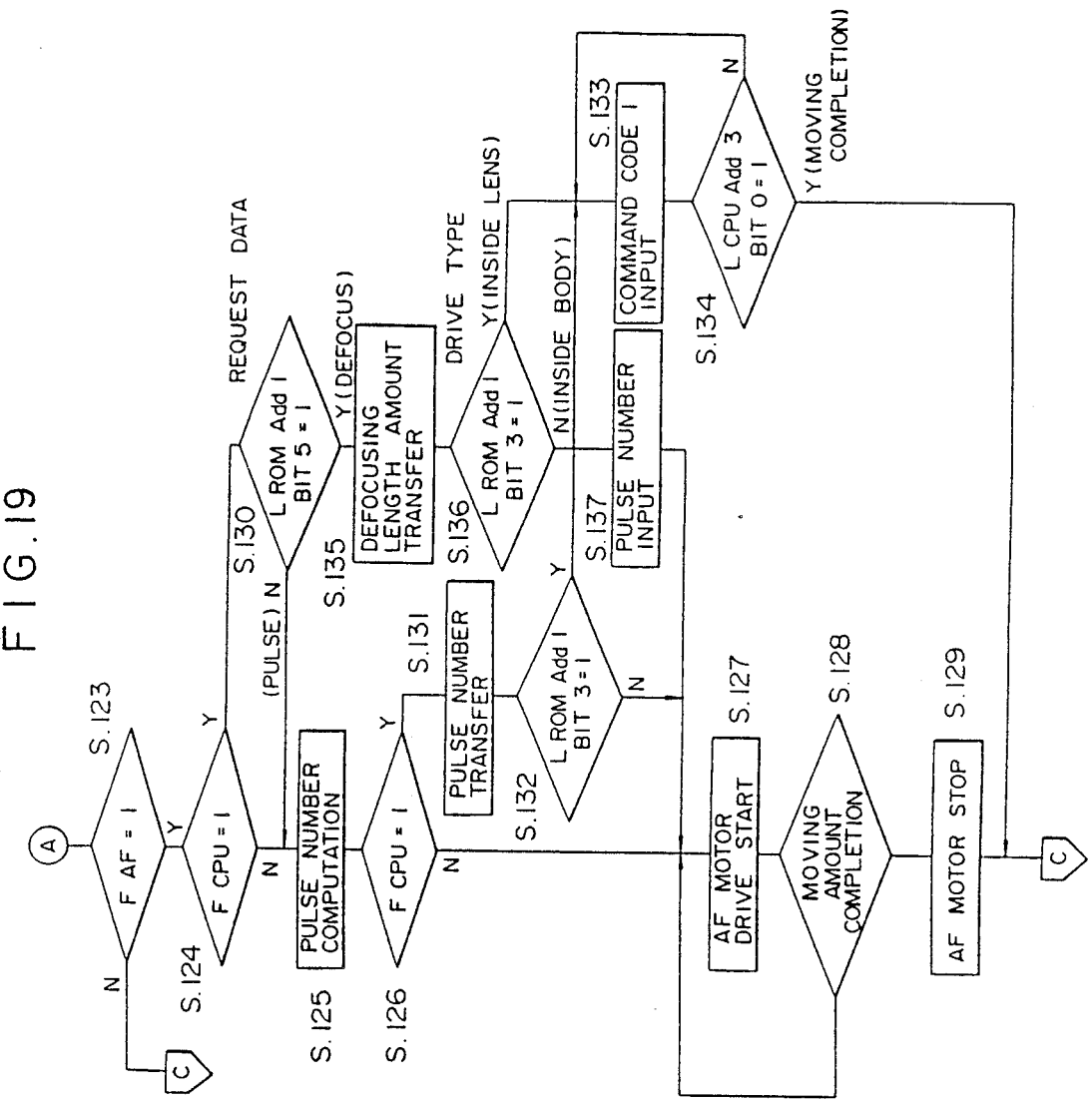

FIG. 12, FIG. 13, and FIG. 15 to FIG. 17 show flow charts representing operations of a display CPU used with the new body;

FIG. 14 shows a timing chart of the process of FIG. 13;

FIG. 18 to FIG. 20 show flow charts representing operations of the main CPU of the new body;

FIG. 21 and FIG. 22 show flow charts representing operations of the lens CPU of the lens.

DESCRIPTION OF THE EMBODIMENTS

Referring to the accompanying drawings various embodiments are subsequently described, wherein a camera body embodying the invention is called a "new body" and a lens unit with a CPU which can perform optical control operations along with the new body is called a "new lens" so as to distinguish them from a camera body and lens unit that has been used in conventional camera systems.

Figure 1:
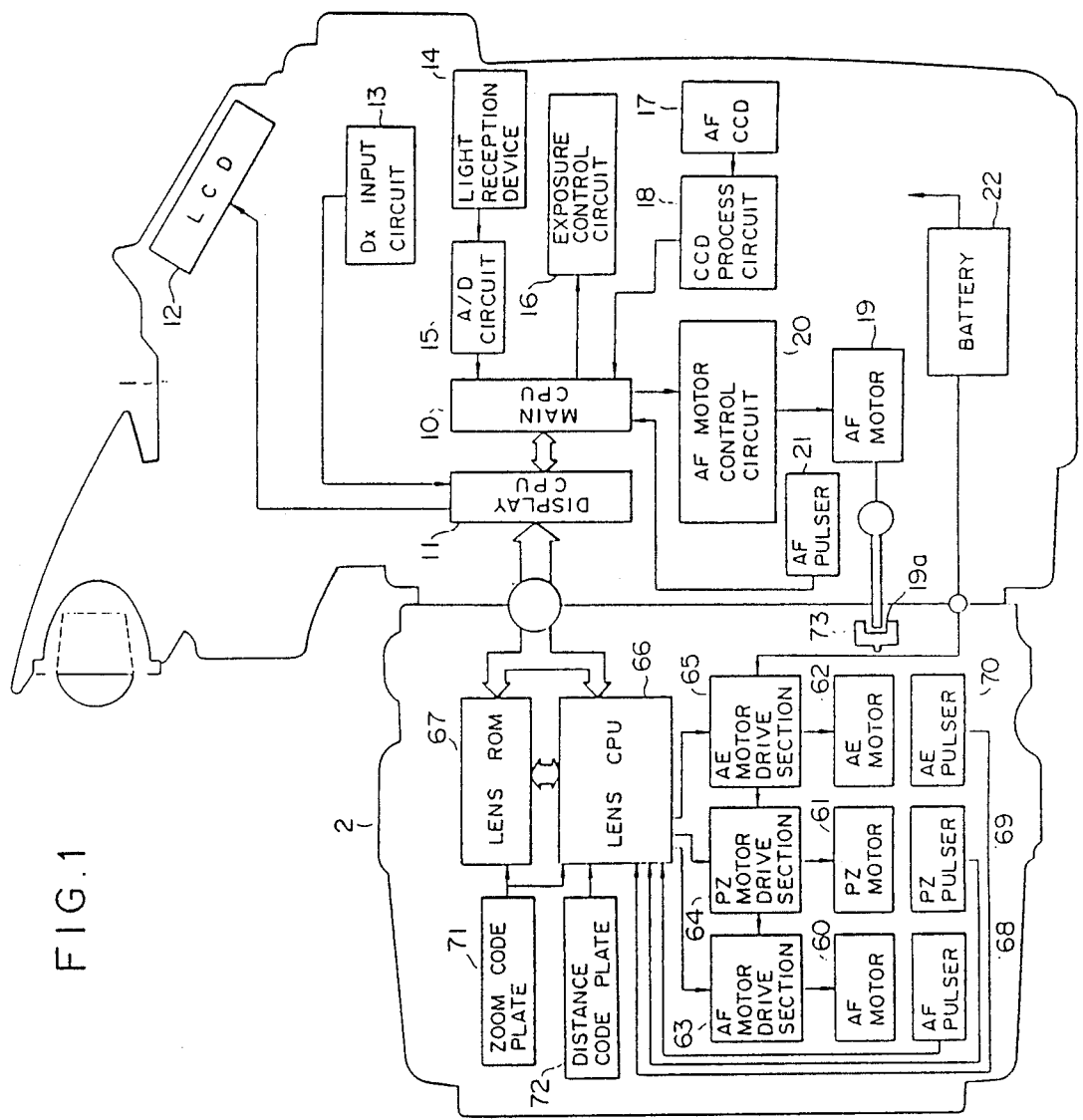
FIG. 1 shows a block diagram representing one embodiment of the camera system relating to the present invention.

FIG. 1 is a block diagram which outlines the present invention which is structured by a combination of a new lens and a new body of the present invention.

New body 1 is equipped with two CPUs: a main CPU 10 which processes various information for photographing and a display CPU 11 which is used to chiefly input information from switches and to exchange and display information for the new lens 2. Besides the main CPU 10 and display CPU 11, the new body 1 also includes an LCD panel 12 which displays various information, a Dx code input circuit 13 where the ISO sensitivity of a film is input with a Dx code printed on a film cartridge, a light receiver 14 which measures the brightness of a subject by an incident light beam through a photographic lens, an A/D circuit 15 which converts analog signals of an output of the light receiver 14 into digital signals, an exposure control circuit 16 which controls a shutter in accordance with various photographic conditions being input thereto, an AF type CCD for detecting a focus condition which receives rays of a subject image formed by the incident light beam through the photographic lens, and a CCD process circuit 18 which detects the focusing state of the photographic lens by an output of the AF CCD 17.

An auto focus (AF) motor 19, which serves to focus a lens, transfers a driving force to the photographic lens through a coupler 19a (see FIG. 2) which is provided on a mount portion when a conventional type photographic lens (which does not provide an AF motor therein) is mounted. The main CPU 10 controls the amount of rotation of the AF motor 19 through an AF motor control circuit 20 according to the signal of the CCD process circuit 18 and the pulse signal of an AF pulser 21 which detects the amount of rotation of the AF motor 19.

A battery 22 supplies electric power to each active element in the camera body described above, to a motor in a photographic lens described later, and to the CPUs.

On the other hand, the new lens 2 houses three motors, which are an AF motor 60, a power zoom (PZ) motor 61, and an automatic diaphragm (stop) control (AE) motor 62. The three motors allow an auto focus operation, power zoom operation, and diaphragm control operation to be conducted with the drive forces in the camera body.

New lens 2 provides a conventional gear mechanism or cam mechanism which performs the focusing and zooming operations by relatively moving each movable lens by rotating a focusing (cam) ring or a zooming cam ring. The AF motor 60 and PZ motor 61 rotate the individual cam rings.

Each motor is controlled by a lens CPU 66 as a computing means (an arithmetic/control means) through an AF motor drive section 63, PZ motor drive section 64, and AE motor drive section 65.

As an information input means to the lens CPU 66, there is a lens ROM 67 which is a storage means for storing information intrinsic to a lens, an AF pulser 68, PZ pulser 69, and AE pulser 70 which converts the amount of driving force of each motor into pulses and detects them, and a zoom code plate 71 and distance code plate 72 which detect a rotation position of the zooming cam ring and focusing cam ring.

The code plate actually consists of a code plate which is fixed to a cam ring and a plurality of brushes which is slide on the code plate. The code plate detects an absolute rotating position of each cam ring by the contact state of the brushes. The "code plate" includes such a code plate and a brush in this specification. FIG. 1 shows the code plate as a general term.

The lens CPU 66 is connected to the control sections and the input means described above. The lens CPU 66 can communicate with the new body 1 through a set of electric contacts to be described later. For example, the lens CPU 66 has a function which receives the quantity (amount) of defocusing detected by the camera body, references data stored in the ROM 67, computes the amount of drive force, detects the amount of drive force by the AF pulser 68, and drives the AF motor 60; or a function which detects the amount of drive force by the AE pulser 70 in accordance with a stop number which is determined by the camera body and rotates the AE motor 62.

The new lens can provide an AF coupler 73 which drives a focus lens so that the AF motor of the camera body can perform the focusing operation.

Structure and Arrangement of a Group of Electric Contacts on Mount

The structure of the mount portion which connects the new body 1 to the new lens 2 will now be described along with the position of electric contacts. In this camera system, a bayonet mount system connects a lens and a body by engaging a plurality of pins provided on both the lens mount and the body mount.

Figure 2:
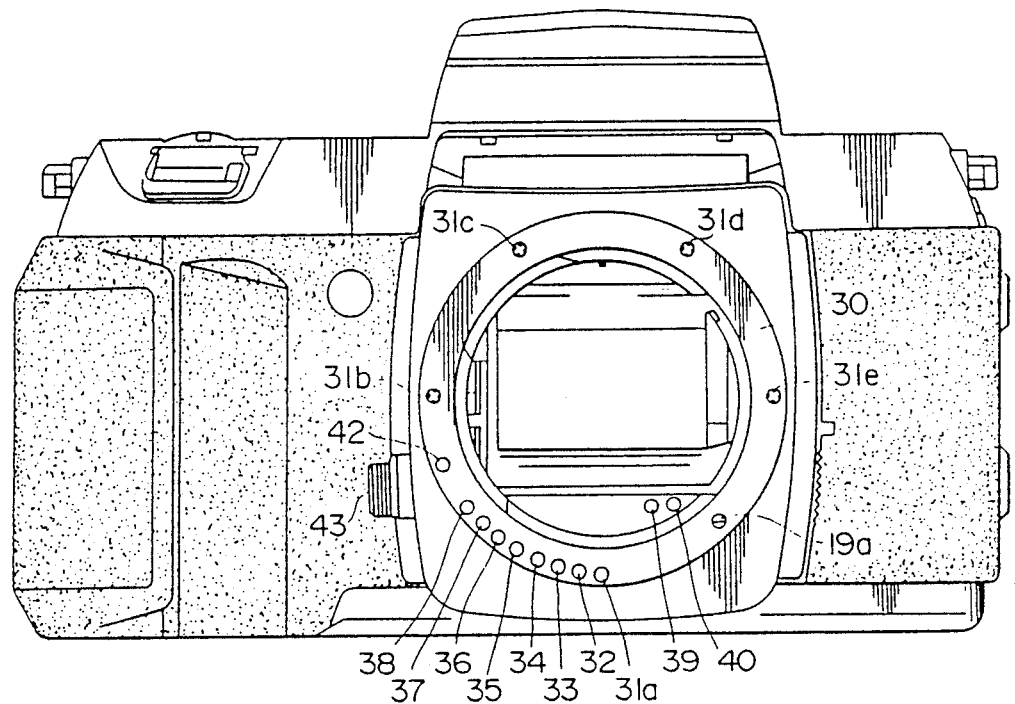
FIG. 2 shows a front view of a new body for use with the present invention.

FIG. 2 shows a front view of the new body 1. On the lens mount opening, a mount ring 30 is fixed with five screws 31a to 31e.

On the mount ring 30, a body side contact Fmax1 32, body side contact Fmax2 33, body side contact Fmax3 34, body side contact Fmin1 35, body side contact Fmin2 36, and body side contact Cont 38 are provided, each of which is insulated from the mount ring 30 and protrudes therefrom. A body side contact A/M 37 is provided in a manner such that it does not protrude from the mount ring 30 and is insulated from the ring 30 (as electrically shown in FIG. 4).

A body side contact $V_{Batt}$ 40 and body side contact Vdd 41 are provided inside the mount ring 30.

Pin 42 is used to prevent a lens from rotating. The pin 42 normally protrude from the mount ring 30 under the force of a spring, and is inserted into an engagement hole of the lens, prohibiting the lens being mounted from rotating. By pushing a lever 43, the pin 42 is retracted into the mount ring 30 thereby allowing the lens to rotate.

Figure 3:
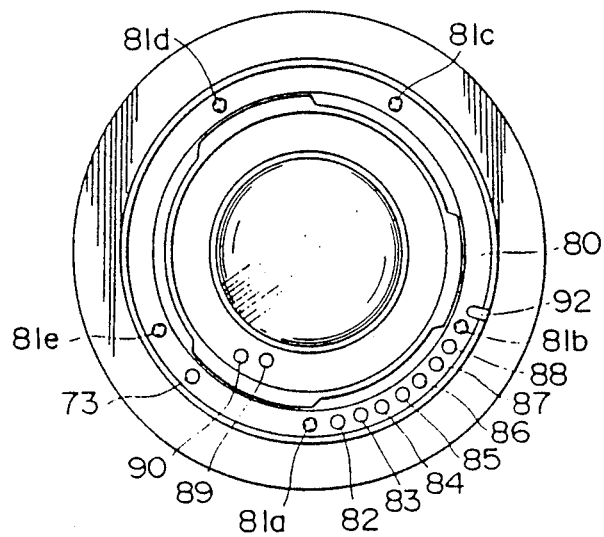
FIG. 3 shows a front view of a new lens mount for use with the present invention.

As shown in FIG. 3, on the mount portion of the new lens 2, a mount ring 80 is fixed with five screws 81a to 81e.

On the mount ring 80, a lens side contact Fmax1 82, a lens side contact Fmax2 83, lens side contact Fmax3 84, a lens side contact Fmin1 85, and lens side contact Fmin2 86 are provided, each of which is insulated from the mount ring 80 and which do not protrude therefrom. A lens side contact Cont 87 and lens side contact A/M 88 are provided in such as manner that they are protrude from the mount and are also insulated from the ring 80 (as electrically shown in FIG. 5).

A lens side contact $V_{Batt}$ 90 and a lens side contact Vdd 89 are provided inside the mount ring 80.

Moreover, an engagement hole 92, which prohibits the lens from rotating when the pin 42 is engaged, is provided on the mount ring 80. The AF coupler 73 is also provided on the mount ring.

In the above contact arrangement, when the new lens 2 is mounted on the new body 1, corresponding contacts are electrically connected. The protrusion and retraction setting of each contact is used for distinguishing a combination state of a conventional camera system and a new camera system of the present invention as described below.

In the above example, two sets of contacts 39, 40 and 89, 90 are provided inside the mount ring. However, it is also possible to provide all the contacts on or inside the mount ring.

New Body Circuit

A new body circuit is herein described in accordance with more detailed circuit diagrams in the following.

Figure 4:
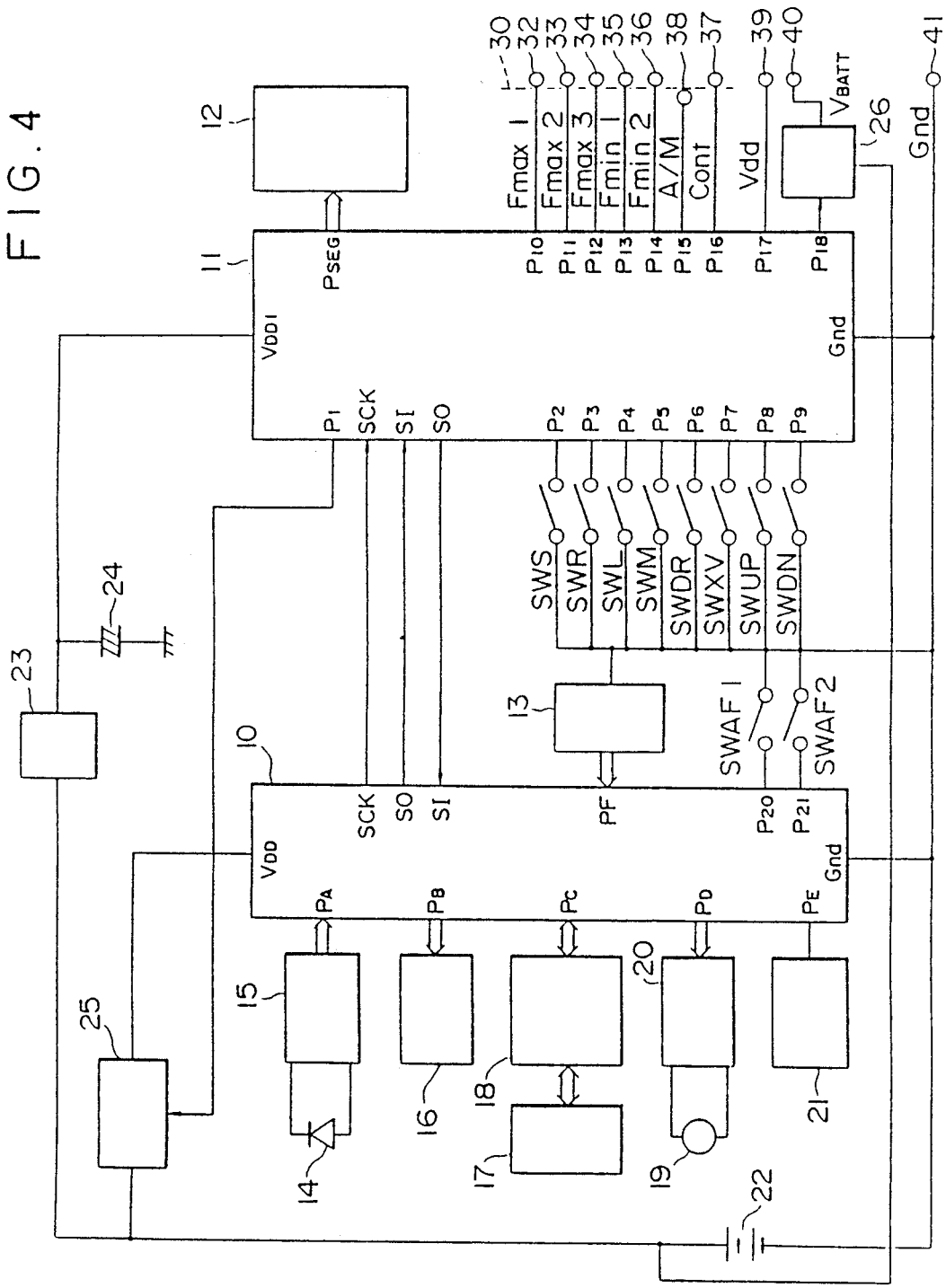
FIG. 4 shows a circuit diagram of the new body of FIG. 2.

FIG. 4 shows a circuit of the new body 1.

At terminal $V_{DD1}$ of the display CPU 11, voltage from the battery 22 is supplied through a regulator 23 to a back up super capacitor 24. Constant voltage is always supplied to terminal $V_{DD1}$.

Terminal P1 of display CPU 11 is connected to a DC/DC converter 25 which turns ON and OFF power to main CPU 10. Terminal P2 is connected to a photometry switch SWS which is turned on when the shutter button is depressed halfway. Terminal P3 is connected to a release switch SWR which is turned on when the shutter button is fully depressed. Terminal P4 is connected to a lock switch SWL which is turned on so as to get ready for the camera to photograph. Data from each switch SWS, SWR and SWL is inputted to the display CPU 11 through terminals P2, P3 and P4 respectively. While the lock switch SWL is turned on, when the photometry switch SWS or the release switch SWR is turned on and when data on the lens side is inputted to the main CPU 10, the DC/DC converter 25 supplies power to terminal $V_{DD}$ of the main CPU 10 by a command from the display CPU 11 to activate them.

Terminal P5 of the display CPU 11 is connected to a mode switch SWM which selects a photographing mode such as a programmed photographing mode, an automatic photographing mode, and a manual photographing mode. Terminal P6 is connected to a drive switch SWDr, which selects a drive mode such as a single shot mode and continuous shot mode. Terminal P7 is connected to an exposure compensation switch SWXv, which allows exposure to be compensated when it is turned on. When one of the switches SWH, SWDr and SWXv connected to terminals P5, P6, and P7 is turned on, by operating an up-count switch SWUp connected to terminal P8 or a down-count switch SWDn connected to terminal P9, individual settings which are changeable by the switches SWM, and SWDr and SWXv can be changed.

A group of terminals $P_{SEG}$ serves to operate the LCD panel 12. When the lock switch SWL is turned on, the LCD panel 12 displays various data necessary for photographing through the set of terminals $P_{SEG}$.

Terminal P10 of the display CPU 11 is connected to body side contact Fmax1 32; terminal P11 to body side contact Fmax2 33; terminal P12 to body side contact Fmax3 34; terminal P13 to body side contact Fmin1 35; terminal P14 to body side contact Fmin2 36; terminal P15 to body side contact A/M 37; terminal P16 to body side contact Cont 38; terminal P17 to body side contact Vdd 39; and terminal P18 to switch circuit 26.

In addition, switch circuit 26 serves to switch between the body side contact $V_{BATT}$ 40 and the battery 22 based upon whether an H (high)/L (low) signal is present at terminal P18. A body side contact Gnd 41 is connected to a ground of the battery 22 along with terminal Gnd of the display CPU 11.

The body side contact Gnd 41 is electrically connected to the mount ring 30.

The display CPU 11 and the main CPU 10 transfer 8 bit command code to each other as listed in TABLE 1 through serial clock terminal SCK, serial-in terminal SI, and serial-out terminal SO.

In TABLE 1, codes 0 to 3, which are outputted from the display CPU 11 to the main CPU 10 are set depending on the settings of the switches provided on the new body, and data of the lens ROM and lens CPU. Codes 4 to 7 are data that is inputted from the display CPU to the main CPU and are set in accordance with measured data by a photometer, an object distance measuring device, and so forth under control of the main CPU 10.

A group of PA contacts of the main CPU 10 are connected to the A/D circuit 15 for photometry; a group of PB contacts to the exposure control circuit 16; a group of PC contacts to the CCD process circuit 18; a group of PD contacts to the AF motor control circuit; a group of PE contacts to the AF pulser 21; a group of PF contacts to the DX input circuit 13. In addition, the A/D circuit 15 is connected to the light receiver 14; the CCD process circuit 18 to the AF CCD 17, the AF motor control circuit 20 to the AF motor 19 in the camera body as described above.

Terminal P20 of the main CPU 10 is connected to a first AF switch $SW_{AF1}$, which switches between an automatic mode and to perform a focusing operation by the AF motor 19 and a manual mode where the user manually performs the focusing operation. Terminal P21 is connected to a second AF switch $SW_{AF2}$, which switches between a focusing priority mode and a release priority mode for a shutter release operation. The first AF switch $SW_{AF1}$ is mechanically interlocked with the second AF switch so that when the first AF switch is placed in the manual mode, the second AF switch $SW_{AF1}$ is set to the release priority mode.

Electric Circuit of New Lens

Figure 5:
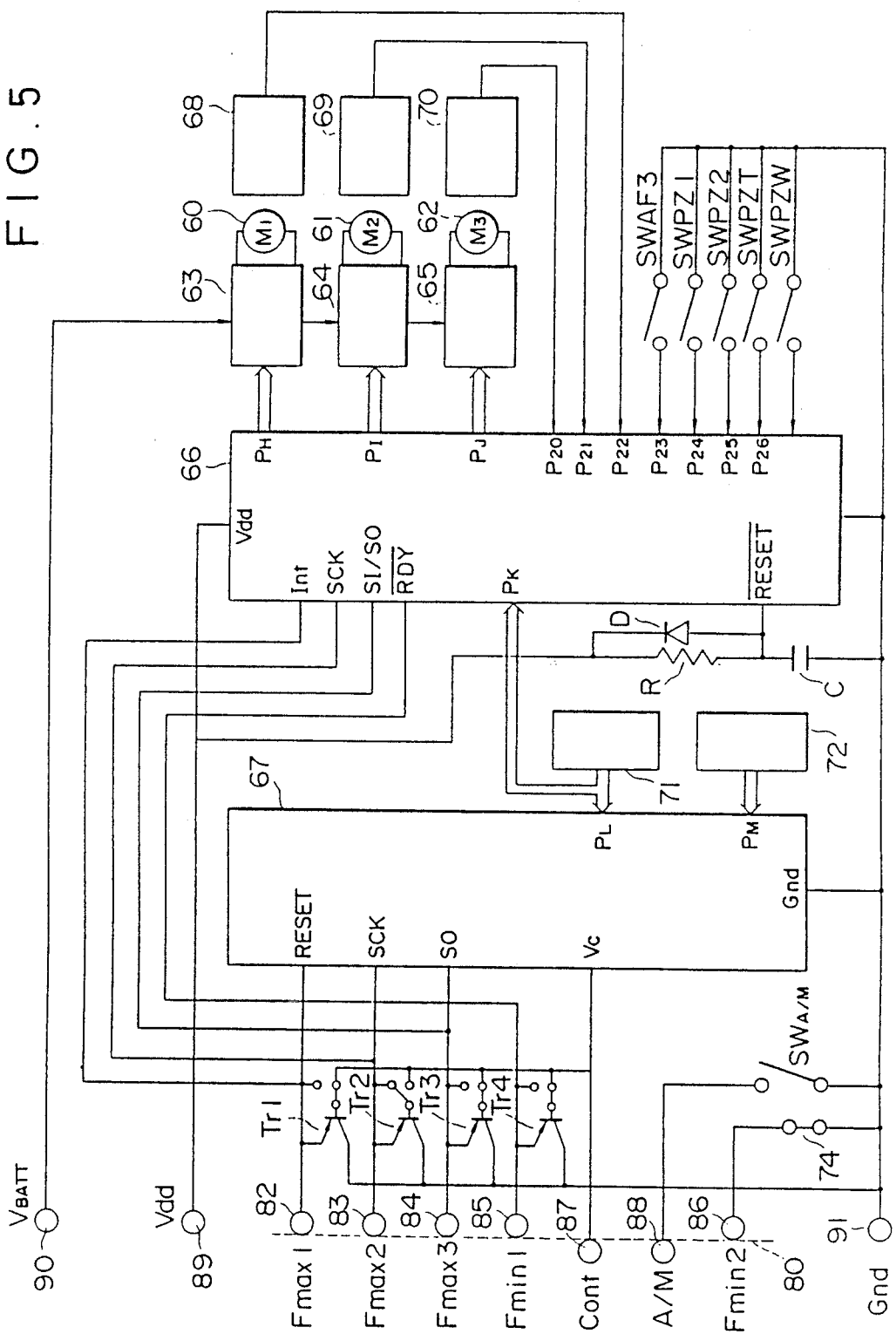
FIG. 5 shows a circuit diagram of the new lens for use with the present invention.

FIG. 5 shows a circuit of the new lens 2. The lens side contact $V_{BATT}$ 90 is connected to the motor drive sections 63, 64 and 65. By switching among these drive sections 63, 64 and 65, a power is supplied directly to the motors 60, 61 or 62 through the contact $V_{BATT}$ 90 from the battery 22 in the camera body, respectively. The motor drive sections 63, 64 and 65 are connected to the terminals PH, PI and PJ of the lens CPU 66, respectively, so as to control them. The pulsers 68, 69 and 70 are connected to terminals P20, P21 and P22, respectively, whereby the driving amount of each motor being detected is inputted to the lens CPU 66.

The lens side contact Vdd 89 supplies power from the body side display CPU 51 to terminal Vdd of the lens CPU 66, and a reset circuit, which comprises a resistor R, diode D and capacitor C.

The reset circuit has a specific time constant determined by the resistor R and the capacitor C. When the power supply voltage has stabilized after Vdd is applied and a specific time period (corresponding to the time constant) elapses, the reset circuit causes the signal state at terminal $\overline{RESET}$ of the lens CPU 66 to be changed from active (L) to inactive (H) and the lens CPU 66 program to be started.

This lens CPU 66 controls each motor driving section in the lens in accordance with information sent from the lens ROM 60 and that being transferred from the body and transfers set data to the camera body. In the RAM of the lens CPU 66, data as listed in TABLE 2 is set, which functions as a third information transfer means. Addresses 0 to 3 of the lens CPU 66 are set by the lens CPU 66 with the setting of lens side switches, data of lens ROM, and input data from the various pulsers. Addresses 4 to 7 are set in accordance with data inputted from the body side main CPU 10 through the display CPU 11.

In addition, addresses 1 to 4 of the lens CPU 66 are an area which stores data for determining the number of drive pulses (K value, Kval) for a focusing lens per image surface moving unit which varies depending on the focal length. This data is computed by data of the lens ROM 67 and is outputted from the PZ pulser and zoom code plate.

In a conventional zoom lens, Kval has been determined by length data of a zoom code range in a lens ROM which is addressed by the same zoom code plate. In the new lens 2, the area of the same zoom cade range can be divided into smaller steps by PZ pulses which are outputted from the PZ pulsers than the conventional zoom lenses do. Whereby a more precise AF control can be performed.

Terminals P23 to P27 of the lens CPU 23 are provided on the lens wherein terminal P23 is connected to a third AF switch $SW_{AF3}$ which switches between an automatic mode and a manual mode of the auto focus operation; terminal P24 is connected to a zoom selection switch $SW_{PZ1}$ which selects between a motor drive mode and a manual mode of the zooming operation; terminal P25 is connected to an image magnification switch $SW_{PZ2}$ which serves to automatically perform the zooming operation depending on a relative movement to a subject so as to keep an image magnification thereof constant; and terminal, P26 is connected to a F side zoom switch $SW_{PZF}$ which causes the PZ motor 69 to move the photographic lens in the direction where the zoom switch $SW_{PZN}$ which causes the PZ motor 69 to move the lens in the direction where the focal length thereof decreases.

The lens CPU 66 includes a terminal INT, whereby electric signals can interrupt an execution of the program thereof; terminal SCK where a serial clock from the body side display CPU 11 is inputted; terminal SI/SO, which transfers serial data; and terminal $\overline{RDY}$, which synchronizes serial communication of the lens CPU 66 with peripheral devices.

Terminal INT allows an interrupt of the lens CPU 66 to be enabled when the signal state thereof is changed from L to H after the reset operation. When the serial communication is enabled, the signal state of terminal $\overline{RDY}$ is changed to L and the communication enable state is informed to the body side display CPU 11.

In addition, the zoom code plate 71 is connected to both the group of PK terminals of the lens CPU 66 and the group of PL terminals of the lens ROM 67. Distance code plate 72 is connected to the set of PM terminals of the lens ROM, so that focal length information and object distance information that is corresponding to the actual lens, conditions can be inputted.

The lens ROM 67 stores information that is intrinsic to the photographic lens, such as minimum F number, maximum F number, and the amount of change of the F number caused by the zooming operation. The lens ROM 67 outputs data under control of the lens CPU 66 or body side CPU. As described in the example, the high order addresses of the lens ROM are assigned in accordance with the zoom code detected from the zoom code plate. On the other hand, the low order addresses are assigned by counting clocks pulses being inputted from terminal SCK.

The lens ROM 67 structures a second information transfer means.

The lens side Fmax1 contact 82 is connected to terminal RESET of the lens ROM 67 and terminal INT of the lens CPU 66. The lens side contact Fmax2 83 is connected to the lens ROM 67 and terminal SCK of the lens CPU 66. The lens side contact Fmax3 84 is connected to terminal SO of the lens ROM 67 and terminal SI/SO of the lens CPU 66. The lens side contact Fmin1 85 is connected to terminal RDY of the lens CPU 66.

Contacts 82 to 85 are connected to the emitters of PNP transistors Tr1 to Tr4. The bases of the PNP transistors Tr1 to Tr4 are selectively connected to contact Cont 87 or the emitter of the respective transistor through a fuse terminal. The collectors of the PNP transistors Tr1 to Tr4 are connected to a Gnd contact X. It is also possible to provide fuses between the emitters and contacts 82 to 85.

While a voltage is applied to each contact 82 to 85, when the potential of the contact Cont 87 is equal to that of the contact Gnd, each transistor is turned on, so that the contacts Fmax1, Fmax3, and Fmin1, which are in the connection state, go L (low level) and the contact Fmax2 which is in the no-connection state goes H (high level). In other words, it functions as one memory cell of a ROM which is provided to each contact 82 to 85. Therefore, by connecting the fuse which is connected to the base of each transistor to the contact Cont 87 or emitter, one bit of information can be stored for each contact 82 to 85. It is also possible to provide these transistors in the lens ROM.

The lens side contact Cont 87 is connected to terminal Vc of the lens ROM 67 which supplies a power supply voltage to the lens ROM 67 from the camera body. When power is supplied, the lens ROM functions.

The lens side contact A/M 89 is connected to a line with a ground potential connected to the lens side contact Gnd 88 through a diaphragm changing switch SW A/M which is switched between an automatic mode and a manual mode of the operation by turning the diaphragm ring on the lens.

The lens side contact Fmin2 86 is grounded through a fuse 74 as a fixed information section which is the same as that provided in a conventional AE lens described later. Depending on whether the fuse is present or absent, one bit of fixed information is transferred to the camera body. The lens side contact Fmin2 86, contact Fmax1 82 to Fmax3 84, and contact Fmin1 85 provide data as listed in TABLES 9-11, which structures a first information transfer means.

The lens side contact Gnd 91 is electrically connected to the mount ring 80. When the lens is mounted on the camera, contact 91 is electrically connected to the mount ring 30 of the body.

Combination of New System and Conventional System

Combinations of the new lens, new body, conventional type lens, and conventional type body are described below.

Figure 6:
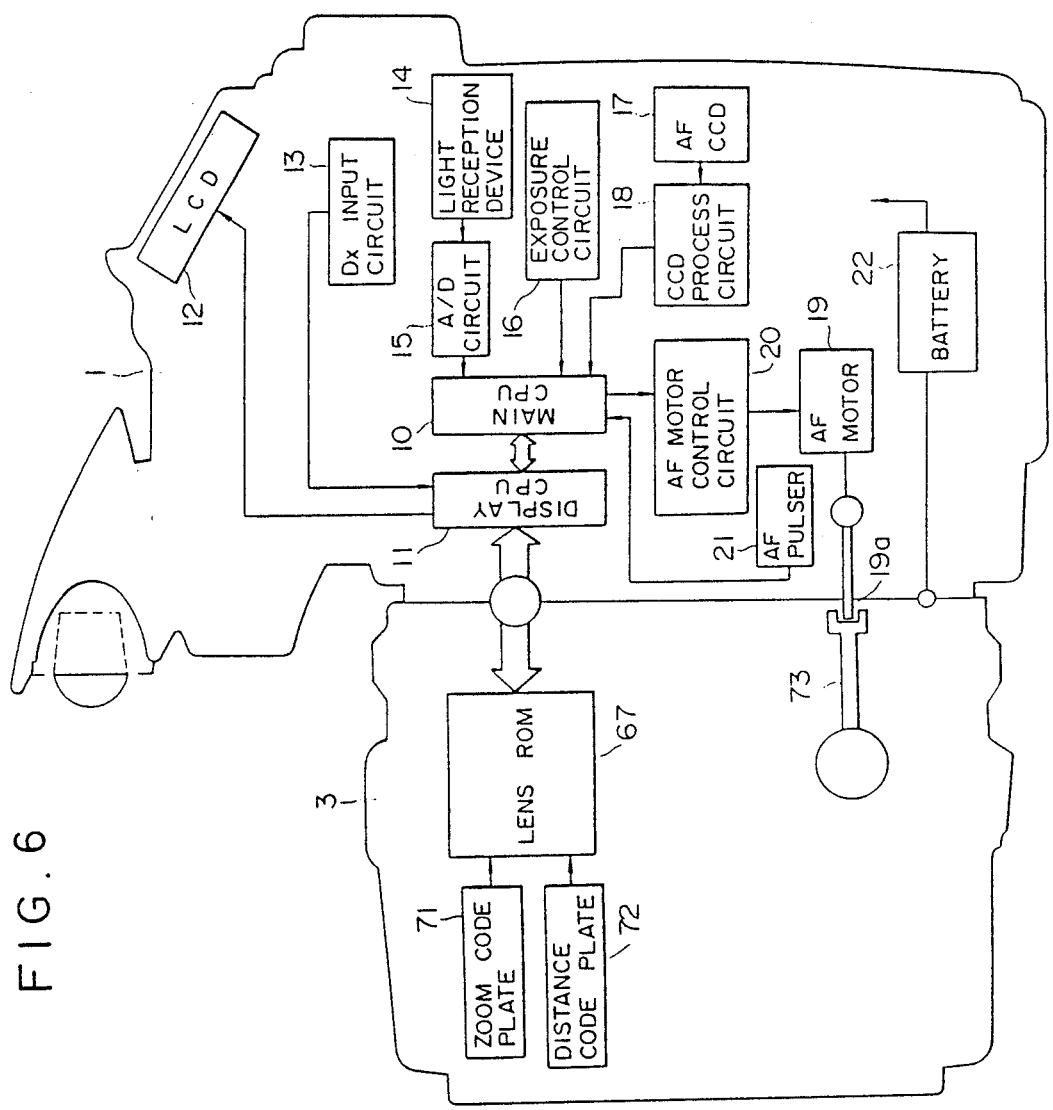
FIG. 6 shows a block diagram representing a combination of the new body and a conventional AEAF lens.

FIG. 6 shows a block diagram wherein an AEAF (Auto Exposure Auto Focus) lens 3, which provides a conventional auto focus function is mounted on the new body 1.

The AEAF lens 3 provides a lens ROM 67 and an AF coupler 73 which drives a lens for the focusing operation by the AF motor 19 in the camera body.

Figure 7:
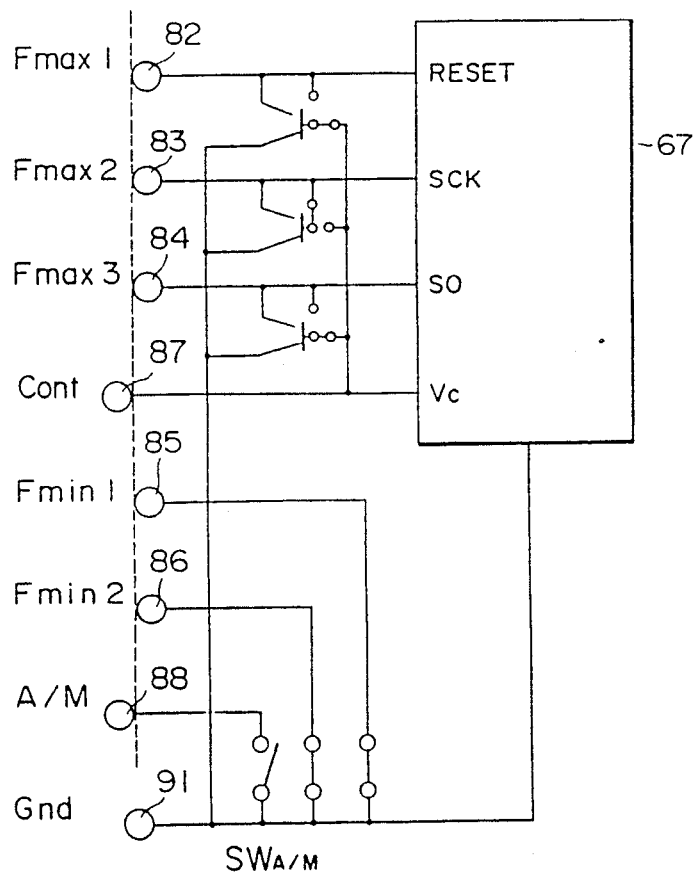
FIG. 7 shows a circuit diagram representing a conventional AEAF lens.
Figure 8:
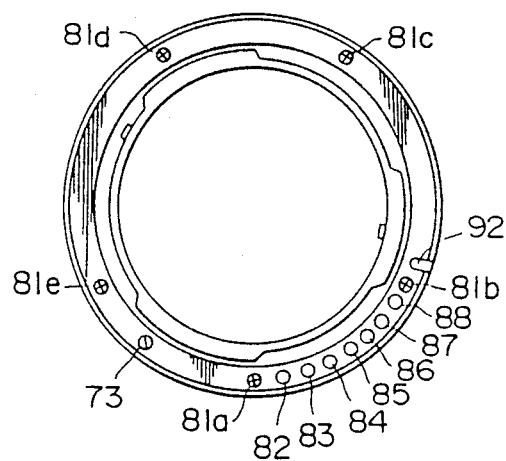
FIG. 8 shows a front view of the lens mount shown in FIG. 7.
Figure 9:
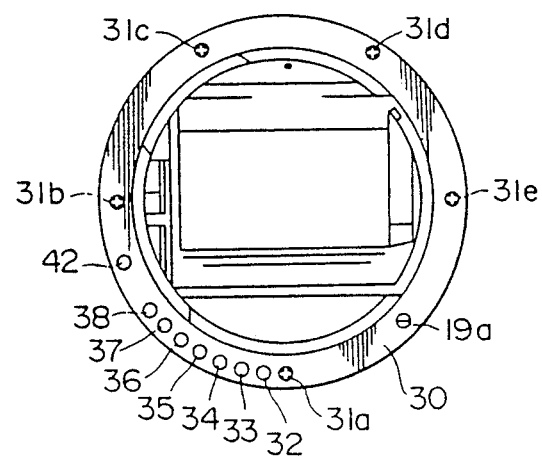
FIG. 9 shows a front view of the mount of a conventional AEAF body.

In addition, as shown in FIG. 7, the AEAF lens 3 provides lens side contacts Fmax1 82 to Fmax3 84 which transfers a minimum F number as 3-bit information when a terminal Cont 87 is grounded; a first information transfer means consisting of contacts Fmin1 85 and Fmin2 86 which transfer a maximum F number as 2-bit information; and a second information transfer means including the lens ROM 67 which can read data by the new body or the conventional type AEAF body CPU with the AEAF function. The arrangement of the contacts is shown in FIG. 8.

When the AEAF lens 3 is mounted on the new body 1, except for two contacts of the new body 1, namely, contact Vdd 39 and contact $V_{BATT}$ 40, the corresponding contacts of lens side and body side are connected to each other, whereby the body can receive second information that the lens ROM stores.

Figure 11:
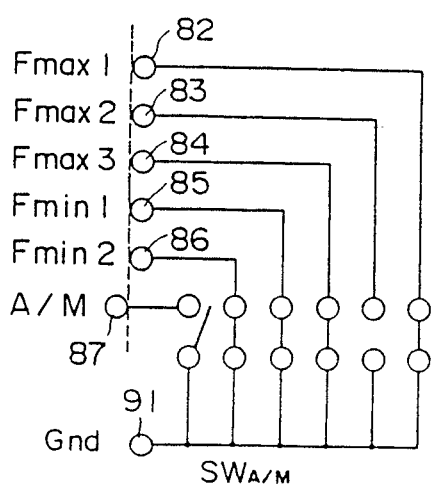
FIG. 11 shows a descriptive diagram of a conventional AE lens.

A conventional AEAF body equipped with an auto focus function and auto exposure function does not provide Vdd and $V_{BATT}$ contacts, as the arrangement of the contacts show in FIG. 11 which is unlike the new body. Since the AEAF body is the same as the new body (at least in the electric circuit diagram) except that the former body does not need the switch circuit connected to the $V_{BATT}$ contact, the drawing of a AEAF body is omitted.

When the new lens 2 is mounted on the AEAF body, since the body does not provide the Vdd contact and $V_{BATT}$ contact, the lens CPU and each motor driving section in the lens do not function. However, because the AF coupler of the body is connected to that of the lens, the same operations as the conventional AEAF system can be performed. In addition, data of the lens ROM can be transferred to the body.

Figure 10:
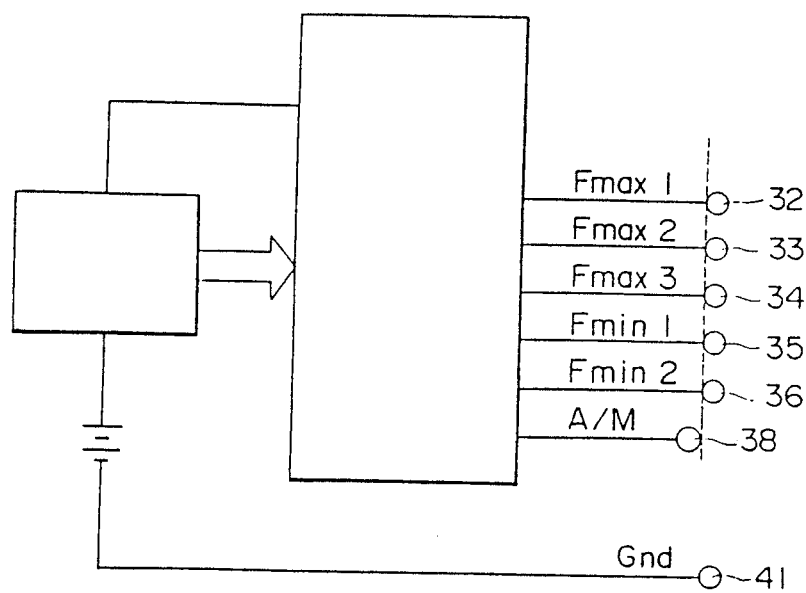
FIG. 10 shows a descriptive diagram of a conventional AE body.

FIG. 10 is a circuit diagram of a conventional AE body which provides only an AE function. This AE body provides the contacts Fmax1 32 to Fmax3 34, contacts Fmin1 35 and Fmin2 36, and contact A/M 38. When the new lens is mounted on this AE body, contact Cont, which protrudes from the mount ring of the body touches a mount ring of the body and a potential of the contact Cont 87 equals that of ground. When a voltage is applied to each contact, the contacts Fmax1, Fmax3, and Fmin2 go L and the contact Fmax2 goes H. Therefore, information of minimum F value $F_{NO}=2.0$ and maximum $F_{NO}=22$, listed in TABLE 9 and TABLE 10 is provided.

FIG. 11 shows a circuit of an AE lens 4 which only provides the AE function. In this lens, each contact provides one bit of information. Between contact A/M 87 and the ground potential, a diaphragm selection switch SW A/M is connected. To the remaining contacts, fuses which provide fixed information are provided. When this AE lens is mounted on the new body 1, a minimum F number, a maximum F number, and information relating to switching between an automatic mode and a manual mode of a diaphragm operation are transferred to the body through the contacts Fmax1 82 to Fmax3 84, Fmin1 85, Fmin2 86 and A/M 88.

Flowchart of New System

Referring to FIGS. 12-22, the operation of the new system constructed as above is described. In the following description, each program of the display CPU 11, main CPU 10, and lens CPU 66 is separately described.

Figure 12:
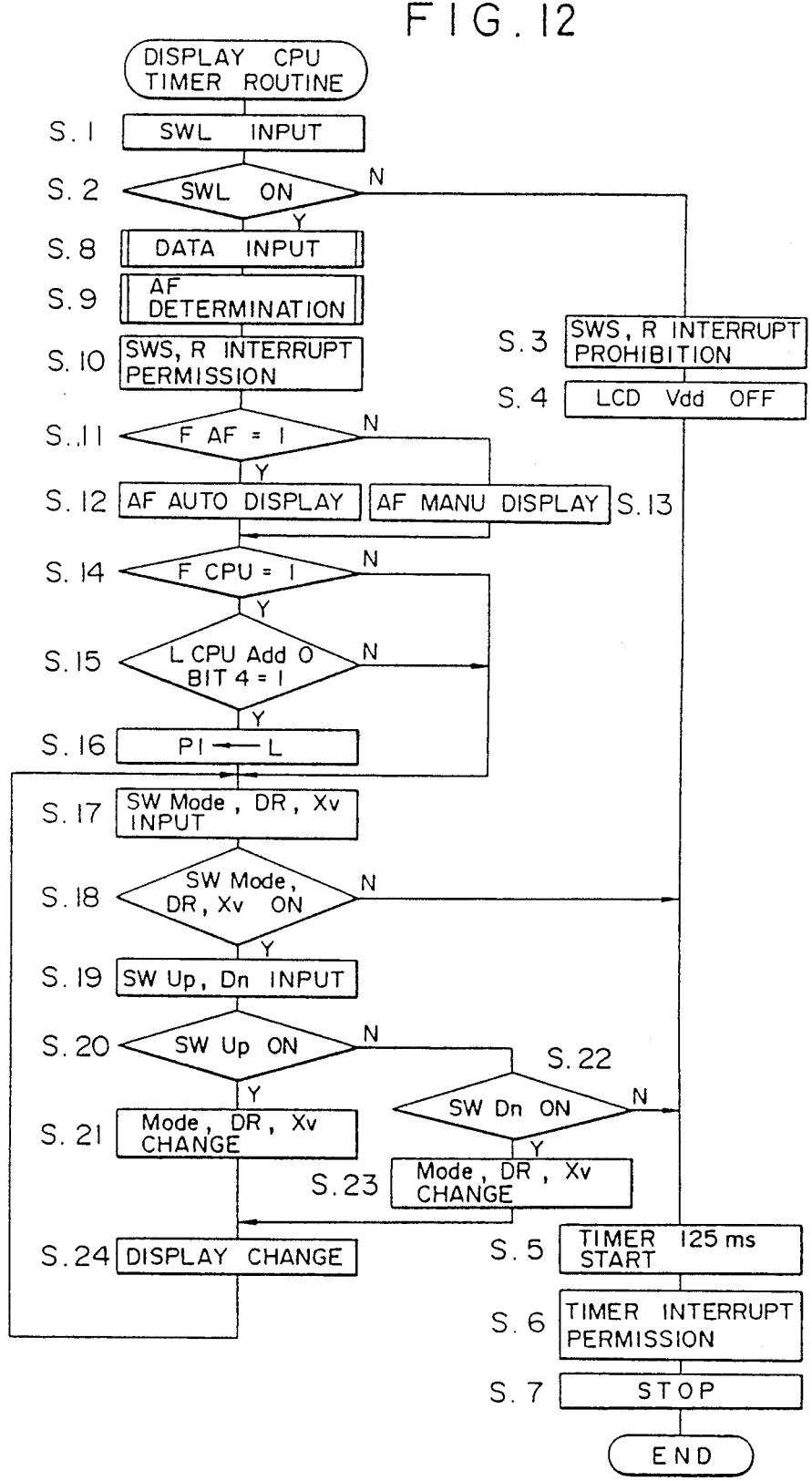

FIG. 12 shows a timer routine of the display CPU 11.

The display CPU 11 detects whether the lock switch state is ON or OFF in steps 1 and 2 (termed S.1 and S.2 hereinafter and in the drawings). When the lock switch is turned OFF, a switch interrupt is prohibited and power to the LCD panel 12 is turned OFF in S.3 and S.4 and waits until the lock switch SWL is turned ON while performing the timer routine in a period of 125 ms in S.5 to S.6 of the timer process.

Figure 15:
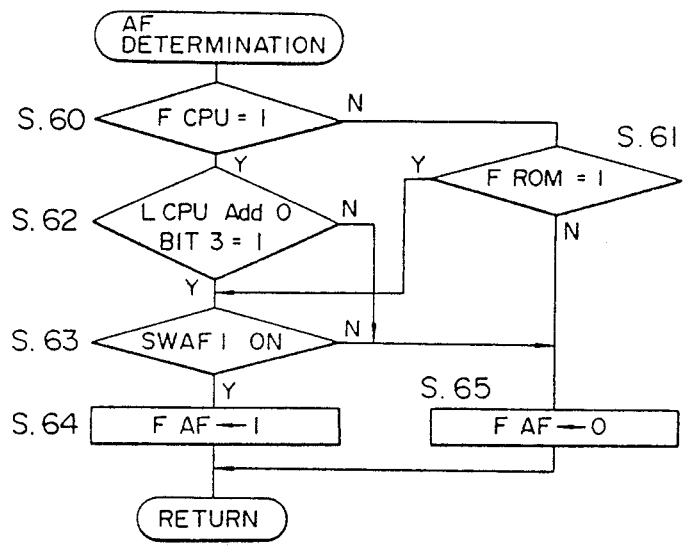

When the lock switch is turned ON, the display CPU 11 detects the type of the lens being mounted by calling a data input subroutine shown in FIG. 13 in S.8 and also detects whether the auto focus mode has been selected by calling an AF determination subroutine shown in FIG. 15 in S.9.

The data input subroutine causes each port which is used for communication with the lens to enter an input mode in S.30 to detect the level of the contact Cont 38 in S.31 and S.32. When the lens does not provide the Cont contract, namely, when an AE lens is mounted, since the contact Cont 37 of the body touches the mount ring, the ground level takes place (namely, L). Consequently, this subroutine reads the minimum F number, the maximum F number, and the stop A/M switching state as an 6-bit parallel data in S.33, sets flag $F_{AE}$ which represents that the lens being mounted is an AE lens in S.34, and returns to the timer routine.

When the Cont contact is in the high (H) level, the data input subroutine causes the signal level to be changed to the low (L) level in S.35 and to detect the signal level of other contacts in S.36 and S.37. When the signal levels of all the contacts being detected are high (H), this subroutine determines that a lens is not mounted, sets flag $F_{NO}$ which represents that the lens has not been mounted in S.38, and then returns to the timer subroutine.

The decision in S.37 is negative when a lens or an AEAF lens has been mounted. Then, the signal level of the Cont contact is changed to high (H) in S.39 to detect the signal level of the other contacts in S.40 and 41. When the signal levels of all the contacts being detected are not high (H), the data input routine determines that the lens CPU, the lens ROM or the lens is defective, sets flag $F_{NO}$ which represents that the lens has not be mounted in S.38, and then returns to the timer routine.

When the data input routine determines that the signal levels of all the contacts are high in S.41, it determines that a lens which provides a lens CPU or lens ROM has been mounted, turns on the power of the lens CPU in S.42 to S.44, changes the mode for the contacts Fmax1 to Fmax3 from the port mode to the serial communication mode in S.45, and waits until the lens CPU becomes ready to communicate in S.46.

When the lens CPU becomes ready to communicate, the routine sends an address of the lens CPU in S.47 and after the lens CPU becomes ready to communicate again, it inputs data of the lens CPU in S.49. This routine detects a ⅔ code of bits 5 to 7 of address 0 of the lens CPU at S.50 and when it is OK, sets flag $F_{CPU}$ to 1, which represents that the lens CPU is provided in S.51. The ⅔ code is a code where 2 of 3 bits is set to "1" as listed in TABLE 3. This code serves to distinguish whether the lens being mounted provides a lens CPU.

In S.52 and S53, the routine causes the signal state of the contact Fmax1 to go low (L) and inputs data of the lens ROM; when $F_{CPU}$ is "1", processing returns to the display timer CPU routine; when $F_{CPU}$ is 0, detects a 2/5 code of bits 3 to 7 of address 0, and when it is OK, sets flag $F_{ROM}$ which represents that a lens is not mounted; when it is not OK, sets flag $F_{NO}$ which represents that the lens is not mounted and returns to the timer routine (S.54 to S.57).

FIG. 14 shows a timing chart of the data input process described above, wherein FIG. 14(a) represents that a AEAF lens ROM which provides a lens ROM is mounted. In this case, the routine detects the signal level of the Cont contract at t1 (S.31), changes the signal level of terminal P10 to L at t2 (S.52), and reads data from the lens ROM from t3 (S.53).

FIG. 14(b) shows a data input process where the new lens (which provides a lens CPU) is mounted to the new body. In this case, at t1 the process performs the same operation as the above subroutine does. However, at t2 the process changes the signal level of the Cont contact to low and inputs the signal level of each contact (S.36); and when they are not all H at t3, changes the signal level of the Cont contact to H (S.39). When all the signal levels of terminals P10 to P13 and P17 are H, the process changes the signal state of the contact Fmax1 to L, the contact Vdd to H at t4 (S.42 and S.43); at t5 the signal level of the contact Fmax1 to H (S.44); at t6 when the signal level of the contact Fmin1 is L (S.46), at t7 the process starts a serial communication (S.47).

FIG. 15 shows the AF detemination subroutine which is called in S.9 of the timer subroutine. First, the subroutine determines which type of lens is mounted by a flag which is set in the data input subroutine described above and performs a process corresponding to the lens being mounted in S.60 and S.61. When the lens has a lens CPU, the subroutine references Add 0 of bit 3 of the lens CPU in S.62. This bit is set by the lens CPU when the third AF switch position is changed. When the switch position is "1", the subroutine further detects the switch state of the first AF switch of body in S.63. When the state of both the switches are ON, the subroutine sets flag $F_{AF}$ so as to indicate that the auto focus mode takes place in S.64. When the state of one of the switches is OFF, the subroutine clears the flag $F_{AF}$ so as to indicate that the manual focus mode takes place.

On the other hand, when an AEAF lens which provides a lens ROM is mounted, the first AF switch of the body determines whether the auto mode or manual mode takes place. When an AE lens which does not provide both a lens CPU and lens ROM is mounted, the manual focus mode is set.

After the process of the above subroutine is completed, when returning back to the timer routine, the display CPU 11 permits a switch interrupt in S.10 and causes the LCD panel to indicate the AF set state corresponding to the flag state described above.

While a lens which provides a lens CPU is mounted, when the lens issues a power hold request in S.14 and S.15, the timer routine changes the signal state of P1 to L and starts the main CPU 10 at S.16.

In S.17 to S.24, when the mode switch, drive switch, exposure compensation switch, and up switch and down switch are provided and operated, a process which changes the operation mode and display indication thereof is conducted.

When such switches are not operated, the processes from S.5 to S.7 are conducted and the processes end.

Figure 16:
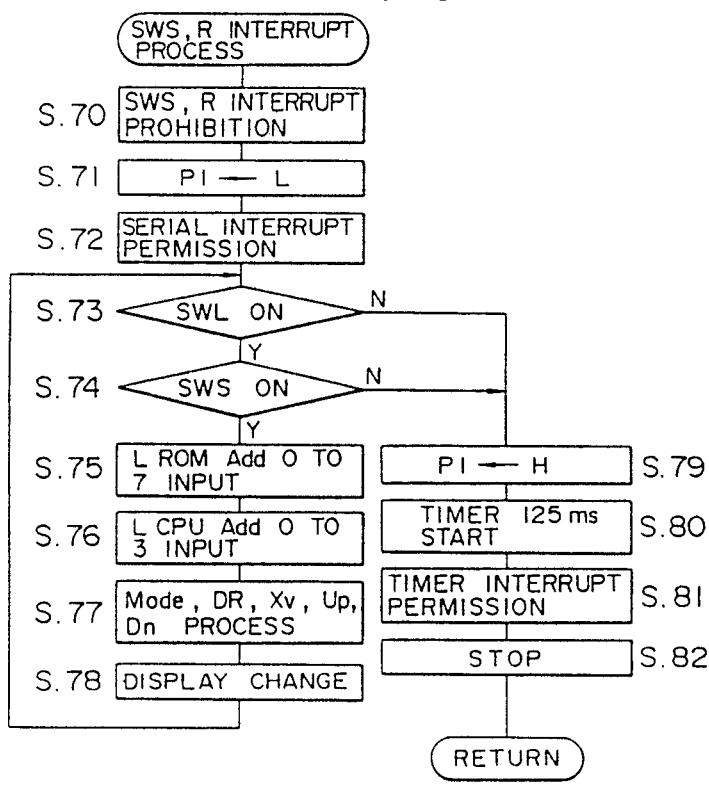
Figure 17:
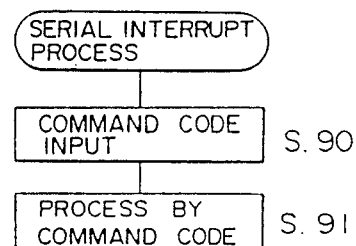

While the timer routine allows "SWS and R interrupt", when the photometry switch and release switch are turned on, an interrupt process shown in FIG. 16 is executed.

In this SWS and R interrupt process, the process prohibits a further SWS and R interrupt in S.70, turns on the power to the main CPU, and permits a serial interrupt.

The serial interrupt is a flow consisting of two steps of a command input operation in S.90 and a related process operation in S.91. This flow serves to communicate with the main CPU in accordance with command codes listed in TABLE 1 and to conduct a required operation.

While both the lock switch SWL and the photometry switch SWS are turned on, the SWS and R interrupt process repeats the processes in S.73 to S.78 so as to input information which is changed over time and to perform the set change process for the mode, drive, and exposure compensation which are the same as those conducted in the timer routine S.17 to S.24.

When either the lock switch SWL or photometry switch SWS is turned off, the interrupt process routine turns off the power to the main CPU, sets the timer, permits a timer interrupt, and stops the process in S.79 to S.82.

Referring to FIG. 18 to FIG. 20, a program installed in the main CPU 10 is described below.

When the DC/DC converter 25 is turned ON and power to the main CPU is turned ON, the main CPU is initialized in S.100 and determines whether the photometry switch SWS or the release switch SWR is turned ON in S.101.

When both the switches SWS and SWR are turned OFF, the program reads command code "1" transferred from the display CPU 11 and determines whether the lens issues a power hold request from the state of Add 0 bit 4 of the lens CPU. When the lens does not issue the power hold request, the main CPU requests the display CPU 11 to turn OFF the power hold in S.104 and terminates the process. When the lens issues the power hold request, the program sets bit 1 of command code 5 to "1" and transfers it to the display CPU 11 in S.105. Consequently, the display CPU receives the data, sets P18 to H, turns ON the switch circuit, and then turns ON the power $V_{BATT}$ of the motor driving section of the lens.

When the photometry switch SWS or the release switch SWR is turned ON, the program transfers a command which requests the display CPU 11 to turn ON the power of the lens CPU, the input photometry A/D, the DX information, the data that the lens provides, the shutter speed set by the body, and the diaphragm value from the display CPU in S.107 to S.109 and compute Tv (Time Value) and Av (Aperture Value) in S.110.

The main CPU 10 transfers information of Tv and Av being computed to the display CPU 11 so as to display them on the LCD panel 12.

The program determines whether the release switch SWR is turned ON or OFF in S.112. While the release switch is turned ON, when AF is in the manual state or the release priority mode is performed, control advances to S.138 (FIG. 20) described later so as to conduct a release process. When the release switch SWR is turned OFF or when it is turned ON while AF is in the auto mode and the focusing priority mode is performed, the program causes the distance measuring process to start.

The main CPU 10 computes the quantity of defocus by inputting CCD data, determines the focusing state from the data and indicates the result in the finder in S.115 to S.117.

When a subject is not focused, the program advances from S.118 to S.123 (FIG. 19) described later so as to perform an AF process. When the amount of defocusing length is "0" in the focusing priority mode, the program performs the focus lock operation when the release switch SWR is turned ON while the photometry switch SWS is turned ON in S.120 and S.121.

In the release priority mode which the switch $SW_{AF2}$ is on, when the release switch SWR is turned ON, the program advances from S.122 to S.138 (FIG. 20). When the release switch SWR is turned OFF, the program advances the process to S.123 rather than activating the release lock operation.

FIG. 19 shows an AF process of the main flow of the main CPU.

When focusing is in the manual mode, the program returns back to S.101 so as to continue the process rather than driving the lens (S.122). In the manual mode, the release priority mode automatically takes place. Thus, when the subject is not focused while the photometry switch SWS is turned ON and the release switch SWR is turned OFF, the program continuously executes the process in a loop until it determines that the release switch SWR is turned ON in S.112. When the release switch SWR is turned ON, the program exits from S.113 to S.138 so as to perform the release process. When the object is focused by manually operating the lens, the program may exit from S.119 and S.122 to S.138.

When the focusing is in the auto mode, the program selects one of five lens drive methods depending on the performance of a CPU being mounted on the lens, as will described below.

The first case (combination) is that a conventional AEAF lens which provides a lens ROM is mounted. In this case, like the conventional method, the main CPU in the body computes drive pulses by the amount of defocusing length in S.125 and the AF motor of the body drives the lens in S.127 to S.129.

The second and third cases (combinations) are that although a lens provides a lens CPU, its performance is not so high. In this case, the program advances from S.130 to S.125 so that the main CPU in the body computes the number of pulses depending on the amount of defocusing length. After that, the program selects whether to drive the focusing lens at the lens side or at the body side in S.132.

In the second case, the AF motor in the body drives the focusing lens. Consequently, like the first case, the program performs the processes in S.127 to S.129.

In the third case, since the focusing lens is driven by a AF motor provided in the lens, the lens CPU drives the AF motor in accordance with the number of pulses transferred in S.131. The main CPU waits until the lens movement completion information is transferred from the lens CPU in S.133 and S.134 and after that, the program advances to S.101.

When the AF motor in the body drives the focusing lens, it is not necessary to transfer the number of pulses for AF to the lens. However, the program transfers the number of pulses to the lens CPU in S.131 which computes the image magnification using the amount of moving length of the focusing lens perfoming a constant image magnification control operation. The constant image magnification control operation varies the magnification of the lens so that the size of the subject image on a film is maintained constant. This operation is conducted in such a manner that the program detects a change of the magnification by the amount of defocus after the subject which has been focused is moved, converts the change of magnification into PZ motor drive pulsers, and controls the PZ motor.

The fourth and fifth cases (combinations) are that a lens being mounted has a very high performance. In these cases, data requests of the lens CPU is the amount of defocusing length. Even in the conventional system, although a program which compensates a non-linear characteristics between the amount of defocus and the amount of driving length of lens has been installed, the system reads compensation data in a lens ROM and causes a CPU in the body to compute the compensation. Consequently, the CPU should have a general purpose function. However, in the fourth and fifth cases, when the lens CPU converts the defocus amount information into pulses, even for a lens with a very complicated linearity, suitable conversion can be performed, resulting in a more precise AF control operation than the conventional system.

In the fourth case, the program inputs the number of drive pulses computed by the lens CPU to the main CPU in S.137 so as to drive the AF motor in the body.

In the fifth case, since the program drives the AF motor in the lens in accordance with drive pulses computed by the lens CPU, the main CPU waits until the lens moving operation is completed in S.133 and S.134; the program then returns back to S.101 and then continues the process.

FIG. 20 shows a release process of the main CPU main flow.

When the program advances from the main flow of the main CPU shown in FIG. 18 to S.138 shown in FIG. 22, only while a lens which does not provide a lens CPU is employed, the program controls the diaphragm and the shutter speed in the body so as to perform an exposure operation. When a lens which provides a lens CPU is employed, the program determines whether to perform the diaphragm control in the lens or from the body based on data in the lens ROM. When the diaphragm control is performed in the lens, the program transfers the number of steps of the AE stop-down operation computed by the main CPU to the lens CPU and issues a stop-down start command and performs the exposure operation with the shutter speed controlled by the body side.

After the exposure operation is completed, the program causes the main CPU to drive the wind motor for winding the film in S.144. When the drive C, namely, continuous shot mode takes place, the program immediately advances to S.101 shown in FIG. 20 so as to continue the process. When the single shot mode takes place, the program waits until the release switch is turned OFF in S.146 and returns back to S.101.

The operation of the lens CPU will be described with reference to FIGS. 23 and 24.

FIG. 21 is a main flow chart of the lens CPU. After the contact goes H by a command from the display CPU, the reset circuit works and the reset operation is released, resulting in the activation of the lens CPU.

The program initializes the lens CPU in S.200, reads data of each switch and zoom code plate provided in the lens S.201 and S.202, and stores it in a RAM.

The program sets the SI/SO terminal to the serial input mode in S.203 to S.205 so as to permit a serial interrupt and sets the RDY contact to L so as to inform the display CPU that the serial communication is enabled.

The program sets a timer so as to continue this process at an interval of 125 ms in S.206 to S.208 and completes the process one time.

FIG. 22 shows a flow chart of the serial interrupt process of the lens CPU which is executed when a serial interrupt from the display CPU of the body occurs.

The program sets the signal level of the contact RDY to H in S.210/ which informs the display CPU that the serial communication is disabled, determines which address of the lens CPU in TABLE 2 accords with the signal being transferred from the display CPU and executes the process corresponding to the address in S.211.

When the program determines that the signal accords with Add 0 to 3, it outputs this data in serial form in S.223 and S.224. This data is set by the lens CPU in accordance with data of the switches and data of the lens ROM. After the data is outputted, the program sets the signal level of the contact RDY to L, changes the port which was changed to the output mode in S.226 and S.227 to the input mode, permits a serial interrupt, and returns back to the main flow so as to continue the process.

When the program determines that the signal accords with Add 5 to 7, it changes the SI/SO contact to the input mode in S.229 and S.230 so as to represent that the communication is enabled, inputs data in S.231, and advances to S.226. This data is transferred to the lens CPU from the main CPU through the display CPU.

When the program determines that the signal does not accord with Add 0 to 3 and Add 5 to 7 and an address which is not Add 4, namely Add 1 to 4 or an address which is not permitted is specified, it advances to S.226 where no practical process is not conducted and then returns back to the main flow.

When data transferred from the display CPU accords with Add 4 of the lens CPU, a process in accordance with the bit is conducted. When bit 7 is "1", the program drives the PZ motor for performing the zooming operation and sets the moving completion bit in S.234 to S.237. When bit 6 is "1", the program drives the AF motor for performing the focusing operation and sets the moving completion bit in S.239 to S.242. When bit 5 is "1", the program drives the AE motor for performing the stop-down operation.

After the process of each motor is completed, the program advances to S.226 and S.227 and returns back to the main flow so as to perform the process.

The operations of the three CPUs included in the new system have not been described.

As described above, the camera system of the present invention determines which types of lens is mounted on a body and inputs three kinds of data depending on the performance of the lens. Conversely, the lens supplies three steps of information depending on the performance of a body.

In addition, when the body and lens (both of which relate to the present invention) is combined, by connecting the control means of the body and that of the lens more precise information can be transferred than with a conventional camera system. For example, more precise AF control operation is available.

TABLE 1

| | (Command Codes) | | | | | | |
|---|---|---|---|---|---|---|---|
| | | | | bit | | | |
| Code | 7 | 6 | 5 | 4 | 3 | 2 | 1 | 0 |
| 0 | Mode | | Drive | | Exposure compensation | | | |
| 1 | Lens CPU | | Add 0 to 3 | | | | | |
| 2 | Lens ROM | | Add 0 to 7 | | | | | |
| 3 | Tv being set | | | | Av being set | | | |
| 4 | Tv to be displayed | | | | Av to be displayed | | | |
| 5 | ISO | | | | | | Vbatt | PH |

TABLE 1-continued

(Command Codes)

| Code | bit 7 | 6 | 5 | 4 | 3 | 2 | 1 | 0 |
|---|---|---|---|---|---|---|---|---|
| 5 | | | | | | | ON Winding information | request |
| 6 | Number of film shots | | | | | | | |
| 7 | Lens CPU Add 4 to 7 | | | | | | | |

TABLE 2

(L-CPU)

| address | bit 7 | 6 | 5 | 4 | 3 | 2 | 1 | 0 |
|---|---|---|---|---|---|---|---|---|
| 0 | 2/3 code | | | PH request | AF A/M | PZ A/M | | Lens O/C |
| 1 | Short focal length data | | | | | | | |
| 2 | Long focal length data | | | | | | | |
| 3 | Sf end | Lf end | Af N end | AF F end | PZ F | PZ S | PZ mv. comp. | AF mv. comp. |
| 4 | PZ start | AF start | AE st.-dn | | | | | |
| 5 | Amount of focal length (number of pulses) | | | | | | | |
| 6 | Amount of defocusing length (number of pulses) | | | | | | | |
| 7 | Number of AE stop-down steps (number of pulses) | | | | | | | |
| 01 | Number of start pulses in zoom code plate range | | | | | | | Ph |
| 02 | Pulse width in zoom code plate range | | | | | | | Pw |
| 03 | Start Kval | | | | | | | Ka |
| 04 | Kval calibration coefficient | | | | | | | Kc |

TABLE 3

| Add 0 2/3 code | | | |
|---|---|---|---|
| bit 7 | 6 | 5 | |
| 1 | 1 | 0 | RAM ver. 1 |
| 1 | 0 | 1 | RAM ver. 2 |
| 0 | 1 | 1 | RAM ver. 3 |

TABLE 4

(L-ROM)

| Add | bit 7 | 6 | 5 | 4 | 3 | 2 | 1 | 0 |
|---|---|---|---|---|---|---|---|---|
| 0 | 2/5 code | | | | | | | |
| 1 | Lens data | | | | | | | |
| 2 | Kvalue data | | | | | | | |
| 3 | AF compensation amount data | | | | | | | |
| 4 | Release Av    Minimum Av | | | | | | | |
| 5 | Exposure compensation amount data | | | | | | | |
| 6 | Focal length data | | | | | | | |
| 7 | Distance code data | | | | | | | |

TABLE 5

| Add 0 bit | | | | | 2/5 code |
|---|---|---|---|---|---|
| 7 | 6 | 5 | 4 | 3 | |
| 0 | 0 | 0 | 1 | 1 | Single lens |
| 0 | 0 | 1 | 0 | 1 | Zoom lens |
| 0 | 0 | 1 | 1 | 0 | Macro lens |

TABLE 6

| Add 0 bit 2, 1 | | |
|---|---|---|
| bit | bit | |
| 0 | 0 | ROM ver. 1 |
| 0 | 1 | ROM ver. 2 |
| 1 | 0 | ROM ver. 3 |
| 1 | 1 | ROM ver. 4 |

TABLE 7

| Add 0 bit 0 | |
|---|---|
| 0 | Input mode |
| 1 | Input/output mode |

TABLE 8

| Add 2 bit | |
|---|---|
| 0 | AF presence/absence |
| 1 | AE presence/absence |
| 2 | PZ presence/absence |
| 3 | AF drive type |
| 4 | AF data request |
| 5 | Pulse request |
| 6 | Defocus request |
| 7 | AE drive type |

TABLE 8

Minimum $F_{NO}$ information

| $F_{NO}$ | Fmin | | |
|---|---|---|---|
| | 3 | 2 | 1 |
| 1.4 | 0 | 0 | 0 |
| 1.7 | 0 | 0 | 1 |
| 2 | 0 | 1 | 0 |
| 2.5 | 0 | 1 | 1 |
| 2.8 | 1 | 0 | 0 |
| 3.5 | 1 | 0 | 1 |
| 4 | 1 | 1 | 0 |
| 4.5 | 1 | 1 | 1 |

TABLE 10

Maximum $F_{NO}$ information

| $F_{NO}$ | Fmax | |
|---|---|---|
| | 2 | 1 |
| 22 | 0 | 0 |
| 32 | 0 | 1 |
| 45 | 1 | 0 |

TABLE 11

| A/M | 0 | 1 |
|---|---|---|
| Lens | Auto | Manu |

What is claimed is:

1. A signel-lens reflex camera system comprising a camera body and a lens unit which is interchangeably mounted to said camera body,
said camera body comprising:

means for detecting a defocus amount based upon a condition of a subject image formed by light that has passed through said lens unit;

first means for transferring data related to said defocus amount detected by said detecting means to said lens unit; and means for driving said lens unit, said lens unit comprising;

a memory for storing information that is intrinsic to said lens unit;

a processor for computing an amount to drive said lens unit, based upon said defocus amount transferred by said first transferring means and said information stored in said memory; and second means for transferring said driving amount computed by said processor to said camera body, wherein said drive means of said camera body is operated in accordance with said driving amount transferred by said second transferring means.

2. A camera body of a single-lens reflex camera, to which a lens unit is interchangeably mounted, comprising:

means for detecting a defocus amount based upon a condition of a subject image formed by a quantity of light that has passed through lens unit;

means for determining whether said lens unit contains a processor;

means for transferring data related to said defocus amount detected by said detecting means to said processor located in said lens unit if said determining means determines that said lens unit contains a processor;

means for receiving data related to said driving amount of said lens unit corresponding to said defocus amount; and means for driving said lens unit based upon said drive amount.

3. A lens unit of a single-lens reflex camera that is interchangeably mounted to a camera body, comprising:

a memory for storing information that is intrinsic to said lens unit;

means for receiving data from said camera body, said data relating to a defocus amount that is detected based upon a condition of a subject image formed by a quantity of light that has passed through said lens unit;

a processor for computing a driving amount for said lens unit based upon said defocus amount and said information stored in said memory; and means for transferring said driving amount to said camera body.

4. a single-lens reflex camera system comprising a camera body and a lens unit which is interchangeably mounted to said camera body, said camera body comprising:

means for detecting a defocus amount based upon a condition of a subject image formed by a quantity of light that has passed through said lens unit;

a processor for computing a driving amount for said lens unit based upon said defocus amount detected by said detecting means and intrinsic information stored in said lens unit; and means for transferring said driving amount computed by said processor to said lens unit, said lens unit comprising;

a memory for storing information that is intrinsic to said lens unit;

a processor for processing said driving amount obtained from said transferring means; and means for driving said photographic lens.

5. A camera body of a single-lens reflex camera, to which a lens unit is interchangeably mounted, comprising:

means for detecting a defocus amount based upon a condition of a subject image formed by a quantity of light that has passed through said lens unit;

a processor for computing a driving amount for said lens unit that corresponds to said defocus amount detected by said detecting means;

means for driving said photographic lens;

first means for determining whether said driving amount for said photographic lens is to be computed by said processor in said camera body, or by a processor located in said lens unit; and second means for determining whether said photographic lens is to be driven by said drive means.

6. A lens unit of a single-lens reflex camera, to be mounted on a camera body, comprising:

means for receiving data from said camera body that relates to a defocus amount detected by said camera body based upon a condition of a subject image formed by a quantity of light that has passed through said lens unit;

a memory for storing information that is intrinsic to said lens unit;

a processor for computing a driving amount for said lens unit based upon said defocus amount and said information stored in said memory; and means for driving said lens unit in accordance with said driving amount computed by said processor.

7. The camera body according to claim 5, wherein said first determining means determines whether said driving amount is to be computed by said processor, in said camera body, depending upon the type of lens unit mounted to said camera body.

8. The camera body according to claim 5, wherein said second determining means determines whether said photographic lens is to be driven by said driving means based upon the type of lens unit mounted to said camera body.

9. A camera system comprising a lens unit that is interchangeably mounted to a camera body, comprising:

means associated with said lens unit for determining the type of camera body to which said lens unit is attached;

means associated with said camera body for determining the type of lens unit to which said camera unit is attached;

means for transferring, between at least one of said camera body or said lens unit, data necessary for taking a properly exposed photograph based upon the combination of said lens unit and said camera body as determined by said lens unit determining means and said camera body determining means; and means for computing an amount to drive said lens unit for obtaining said properly exposed photograph based on said data transferred by said transfer means.

10. The camera system of claim 9, wherein said camera body determines whether said lens unit attached to said camera body contains only a lens ROM or a lens ROM and a lens central processing unit.

11. The camera system of claim 10, wherein said camera unit offloads at least some processing functions to said lens unit for computing said drive amount if said camera body determines that said lens unit contains a lens central processing unit.

12. The camera system of claim 10, wherein said drive amount is calculated by a central processing unit located in said camera body.

13. The camera system of claim 10, wherein said drive amount is calculated by said lens central processing unit.

14. The camera system of claim 10, wherein said drive amount is calculated by both a central processing unit located in said camera body and by said lens central processing unit when said camera body determines that said lens unit contains said lens central processing unit.

15. A camera system, comprising:
a camera body;
a lens unit that is selectively connected to said camera body;
means for detecting a defocus amount of an object to be photographed, based upon light from said object that passes through said lens unit;
means associated with said camera body for determining whether said lens unit contains a lens microprocessor;
means for exchanging data between said camera body and said lens unit, said exchanged data being dependent upon the presence or absence of said lens microprocessor in said lens unit, said exchanged data being related to said defocus amount; and
means for driving said lens unit in response to a calculation performed on said exchanged data so as to obtain a properly focused photograph.

16. The camera system of claim 15, wherein said driving means comprises a motor for driving said lens unit to obtain said properly focused photograph.

17. The camera system of claim 16, wherein said motor is contained inside said camera body.

18. The camera system of claim 16, wherein said motor is contained inside said lens unit.

19. The camera system of claim 15, wherein a camera body microprocessor in said camera body determines whether said lens unit contains a lens microprocessor.

20. The camera system of claim 15, wherein said camera body performs all said calculations necessary for determining said drive amount if said determining means determines that said lens unit does not contain a lens microprocessor.

21. The camera system of claim 15, wherein said lens unit performs all said calculations necessary for determining said drive amount if said determining means determines that said lens unit does contain a lens microprocessor.

22. The camera system of claim 15, wherein said lens unit and said camera body perform parallel processing of said calculations necessary for determining said drive amount if said determining means determines that said lens unit does contain a lens microprocessor, said parallel processing permitting more complex calculations to be performed in a minimum period of time for determining said drive amount.

23. The camera system of claim 15, wherein said camera body includes a control terminal CONT that is used to determine whether a lens unit having a lens microprocessor is attached to said camera body.

24. The camera system of claim 23, wherein a lens unit that does not contain a lens microprocessor is attached to said camera body when said CONT terminal is grounded.

25. The camera system of claim 23, wherein when said CONT terminal is high, said camera body determines that either said lens unit attached to said camera body contains a lens microprocessor or that no lens unit is attached to said camera body.

26. The camera system of claim 25, wherein if said lens unit is attached to said camera body, said lens unit exchanges data with said camera body in a serial data stream.

27. The camera system of claim 25, wherein after it is determined that said CONT terminal is high, said camera body determines that no lens unit is attached to said camera body if all the data being sent across at least one data terminal is high.

28. A camera system, comprising:
a camera body, said camera body containing a first processing unit;
a lens unit that is selectively connected to said camera body, said lens unit containing a lens ROM and a second processing unit;
a control terminal CONT for determining whether said lens unit having said second processing unit is connected to said camera body;
means for detecting a defocus amount of an object to be photographed, based upon light from said object that passes through said lens unit when said lens unit is connected to said camera body;
means for serially exchanging data between said first processor in said camera body and said second processor in said lens unit after said camera body has determined that said lens unit having said second processing unit is connected to said camera body, said exchanged data being related to said defocus amount;
means for performing a series of calculations on said data for driving and lens unit so that there is no defocus amount, resulting in an in-focus condition of said object to be photographed, said calculations being performed by at least one of said two processing units; and
means for driving said lens unit having said second processing unit so as to obtain said in-focus condition.

29. The camera system of claim 28, wherein said CONT terminal is driven to a high signal condition when either said lens unit containing said second processing unit or no lens unit is connected to said camera body.

30. The camera system of claim 29, further comprising said camera body being selectively connectable to a lens that contains a ROM.

31. The camera system of claim 30, wherein said CONT terminal is grounded when said lens that only contains a ROM is connected to said camera body.

32. The camera system of claim 31, wherein said camera body exchanges data in a parallel fashion with said lens unit that only contains a ROM.

33. The camera system of claim 29, wherein said camera body exchanges data in a parallel fashion with said lens unit that only contains a ROM.

34. The camera system of claim 33, wherein said serial data is exchanged over at least one of the signal lines that are used to exchange said parallel data.

35. The camera system of claim 28, wherein said driving means comprises a motor for adjusting a focal length of said lens unit.

36. The camera system of claim 28, further comprising means for effecting a zooming operation of said lens unit.

37. The camera system of claim 36, wherein said zooming operation is performed by a motor.

38. The camera system of claim 37, wherein said motor is located in said lens unit.

39. The camera system of claim 28, further comprising means for effecting an automatic exposure operation.

40. The camera system of claim 39, wherein said automatic exposure operation controls a diaphragm operation.

41. The camera system of claim 40, wherein said diaphragm operation is controlled by a motor.

42. The camera system of claim 41, wherein said motor is located in said lens unit.

43. The camera system of claim 28, further comprising:
   means for effecting a power zoom operation of said lens unit; and
   means for electrically effecting a diaphragm operation.

44. A method for performing automatic photography, comprising the steps of:
   obtaining a defocus amount of an object to be photographed, based upon light from the object and which passes through a lens unit that is selectively connected to a camera body;
   determining whether the lens unit contains a means for storing data and a lens processor;
   exchanging a first set of data between the camera body and the lens unit when the lens unit contains a lens processor, the first set of data being related to the defocus amount;
   exchanging a second set of data between the camera body and the lens unit when the lens unit does not contain a lens processor, the second set of data being related to the defocus amount;
   calculating an amount to drive the lens to obtain an in-focus condition, the calculations using either the first or second set of exchanged data, the calculations being performed by either the lens processor, if it is present, or by a camera body processor, if the lens unit lacks a lens processor; and
   driving the lens unit to obtain the in-focus condition based upon the calculated data.

45. The method of claim 44, wherein when the lens unit contains a lens processor, both the lens processor and the camera body processor perform the calculations necessary for obtaining the lens drive amount.

46. The method of claim 44, wherein when the lens unit contains a lens processor, the lens processor performs the calculations necessary for obtaining the lens drive amount.

47. The method of claim 44, when the lens unit does not contain a lens processor, the camera body processor performs the calculations necessary for obtaining the lens drive amount.

48. The method of claim 44, further comprising the step of controlling a diaphragm for effecting an automatic exposure.

49. The method of claim 48, wherein the diaphragm is controlled by calculating an exposure value using either the first or second exchanged data.

50. The method of claim 44, further comprising the step of initially determining whether a lens unit is selectively connected to the camera body.

51. The method of claim 50, wherein the step of determining whether a lens unit is connected to the camera body involves testing a signal control line CONT.

52. The method of claim 51, wherein the camera body determines that either a lens unit that contains a lens processor or no lens unit is connected to the camera body when the signal control line CONT is high.

53. The method of claim 52, further comprising the step of examining the data being provided to the camera body, whereby when all the data being provided is the same, the camera body determines that no lens unit is connected to the camera body.

54. A camera system, comprising:
   a camera body that contains a microprocessor;
   an accessory that is selectively connected to said camera body;
   first means associated with said camera body for determining whether said accessory contains a microprocessor;
   means for exchanging data between said camera body and said accessory, said exchanged data being dependent upon the presence or absence of said microprocessor in said accessory, said exchanged data being related to a photographic operation; and
   means for controlling said camera system in response to a calculation performed on said exchanged data by at least one of said microprocessors.

55. The camera system of claim 54, further comprising second means for determining which microprocessor is to perform said calculation, based upon how complex a calculation is to be performed.

56. The camera system of claim 54, further comprising second means for determining which microprocessor is to perform said calculation, based upon a computing capability of said microprocessor in said camera body.

57. The camera system of claim 54, further comprising second means for determining which microprocessor is to perform said calculation, based upon a computing capability of said microprocessor in said camera body and said microprocessor in said accessory.

58. The camera system of claim 54, further comprising second means for determining which microprocessor is to perform said calculation, based upon how many operations are being performed by said microprocessor in said camera body and said microprocessor in said accessory.

59. The camera system of claim 54, wherein said camera body performs all said calculations necessary for controlling said camera system if said first determining means determines that said accessory does not contain a microprocessor.

60. The camera system of claim 54, wherein said microprocessor in said accessory and said microprocessor in said camera body perform parallel processing of said calculations if said first determining means determines that said accessory does contain a microprocessor, said parallel processing permitting more complex calculations to be performed in a minimum period of time for controlling said camera system.

61. The camera system of claim 54, wherein said camera body includes a control terminal CONT that is used to determine whether said accessory having a microprocessor is attached to said camera body.

62. The camera system of claim 61, wherein if said accessory is attached to said camera body, said accessory exchanges data with said camera body in a serial data stream.

* * * * *

UNITED STATES PATENT AND TRADEMARK OFFICE
CERTIFICATE OF CORRECTION

PATENT NO. : 5,065,175

DATED : November 12, 1991

INVENTOR(S) : N. SUZUKI et al.

It is certified that error appears in the above-indentified patent and that said Letters Patent is hereby corrected as shown below:

On the Title page, in section [56], "References Cited", "FOREIGN PATENT DOCUMENTS", insert ---64-62608 3/1989 Japan---.

On the Title page, in section [56], "References Cited", "FOREIGN PATENT DOCUMENTS", insert ---64-79713 3/1989 Japan---.

At column 18, line 65 (claim 1, line 1), change "signel" to ---single---.

At column 19, line 53 (claim 4, line 1), change "a" (first occurrence) to ---A---.

Signed and Sealed this

Eighteenth Day of March, 1997

Attest:

BRUCE LEHMAN

Attesting Officer

Commissioner of Patents and Trademarks